US008279714B2

(12) United States Patent
Paul et al.

(10) Patent No.: US 8,279,714 B2
(45) Date of Patent: Oct. 2, 2012

(54) COMPLIANT OCEAN WAVE MITIGATION DEVICE AND METHOD TO ALLOW UNDERWATER SOUND DETECTION WITH OCEANOGRAPHIC BUOY MOORINGS

(75) Inventors: Walter Paul, Falmouth, MA (US);
Donald B. Peters, Falmouth, MA (US)

(73) Assignee: Wood Hole Oceanographic Institution, Woods Hole, MA (US)

( * ) Notice: Subject to any disclaimer, the term of this patent is extended or adjusted under 35 U.S.C. 154(b) by 13 days.

(21) Appl. No.: 12/632,632

(22) Filed: Dec. 7, 2009

(65) Prior Publication Data
US 2010/0246331 A1 Sep. 30, 2010

Related U.S. Application Data

(60) Provisional application No. 61/201,011, filed on Dec. 5, 2008.

(51) Int. Cl.
*G10K 11/00* (2006.01)
*H04B 17/00* (2006.01)
(52) U.S. Cl. .......................................... 367/173; 367/12
(58) Field of Classification Search .................... 367/12, 367/173
See application file for complete search history.

(56) References Cited

U.S. PATENT DOCUMENTS

| | | | | |
|---|---|---|---|---|
| 4,065,822 A | * | 1/1978 | Wilbourn | 441/4 |
| 4,568,295 A | * | 2/1986 | Poldervaart | 441/3 |
| 4,999,816 A | * | 3/1991 | Dale et al. | 367/4 |
| 5,784,337 A | * | 7/1998 | Rainey et al. | 367/131 |
| 5,816,874 A | * | 10/1998 | Juran et al. | 441/1 |
| 5,968,418 A | * | 10/1999 | Matsushita et al. | 252/500 |
| 6,155,609 A | * | 12/2000 | Kirma | 285/126.1 |
| 6,311,017 B1 | * | 10/2001 | Mori | 396/27 |
| 7,226,328 B1 | * | 6/2007 | Puzella et al. | 441/11 |
| 2002/0015358 A1 | * | 2/2002 | Diachok | 367/131 |
| 2002/0177375 A1 | * | 11/2002 | Cottrell et al. | 441/5 |
| 2005/0105391 A1 | * | 5/2005 | Berg | 367/15 |
| 2007/0231072 A1 | * | 10/2007 | Jennings et al. | 405/75 |
| 2009/0269709 A1 | * | 10/2009 | Fowler et al. | 431/1 |

OTHER PUBLICATIONS

Paul, W.; Chaffey, M.; Hamilton, A.; Boduch, S.; , "The use of snubbers as strain limiters in ocean moorings," Oceans, 2005. Proceedings of MTS/IEEE , vol., no., pp. 2722-2729 vol. 3, 2005.*
Paul, W.; "Hose elements for buoy moorings: design fabrication and mechanical properties." Woods Hole Oceanographic Institution, Technical Report, WHOI—Jun. 2004. 20 pp. Jul. 2004.*

* cited by examiner

*Primary Examiner* — Jack W Keith
*Assistant Examiner* — James Hulka
(74) *Attorney, Agent, or Firm* — Goodwin Procter LLP

(57) ABSTRACT

The systems and methods described herein relate to a device which enables oceanographic surface buoy mooring systems to detect and monitor underwater noise at most sea state and weather conditions. In particular, the systems and methods described herein provide mooring systems that can support a hydrophone or other underwater listening devices connected to a surface buoy located at a deep sea position. As will be more fully described below, the mooring includes an expandable tether cable/hose that reduces noise generated underwater when the buoy moves in response to wave and weather.

18 Claims, 13 Drawing Sheets

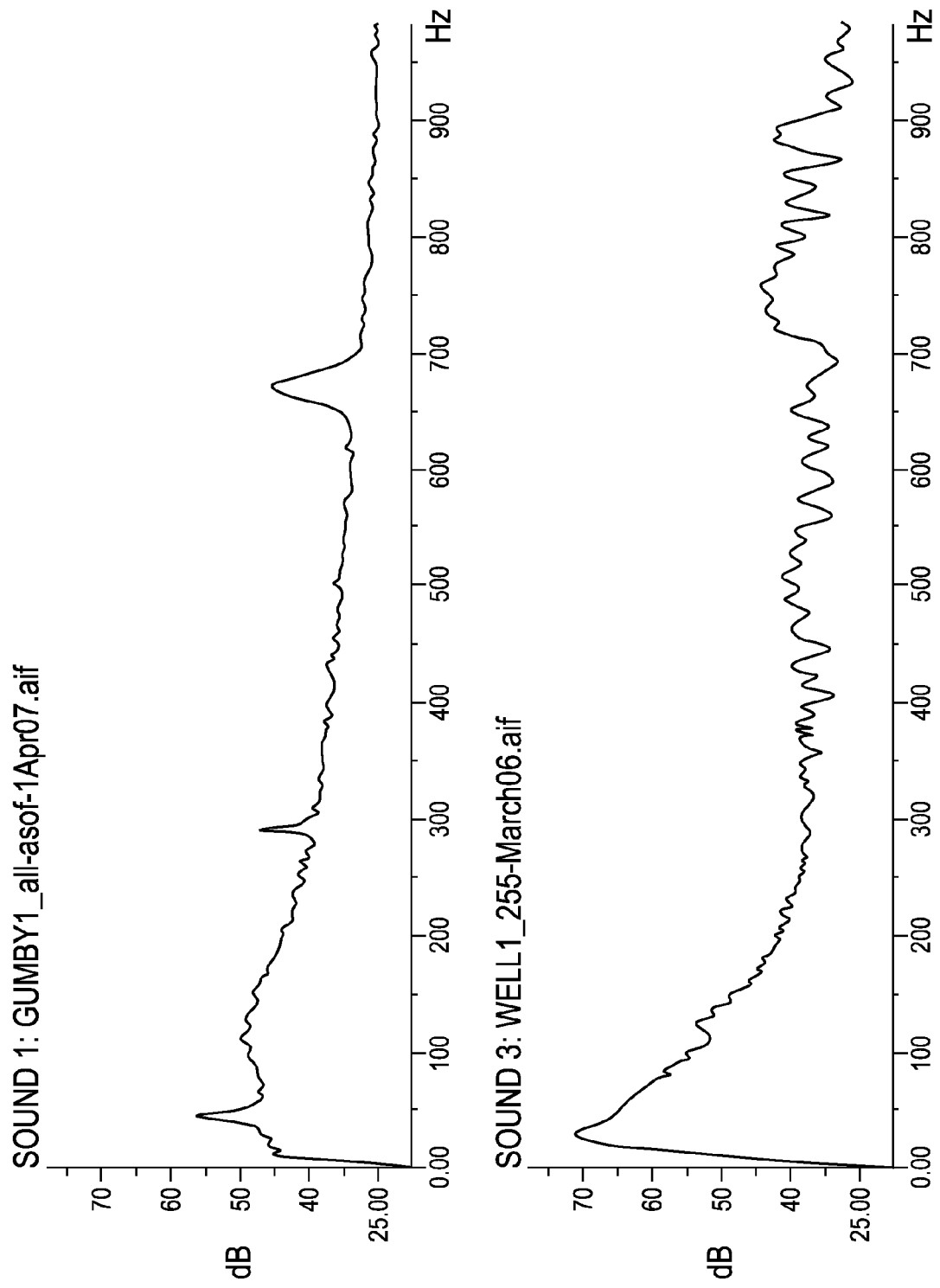
FIGURE 9 (part1)

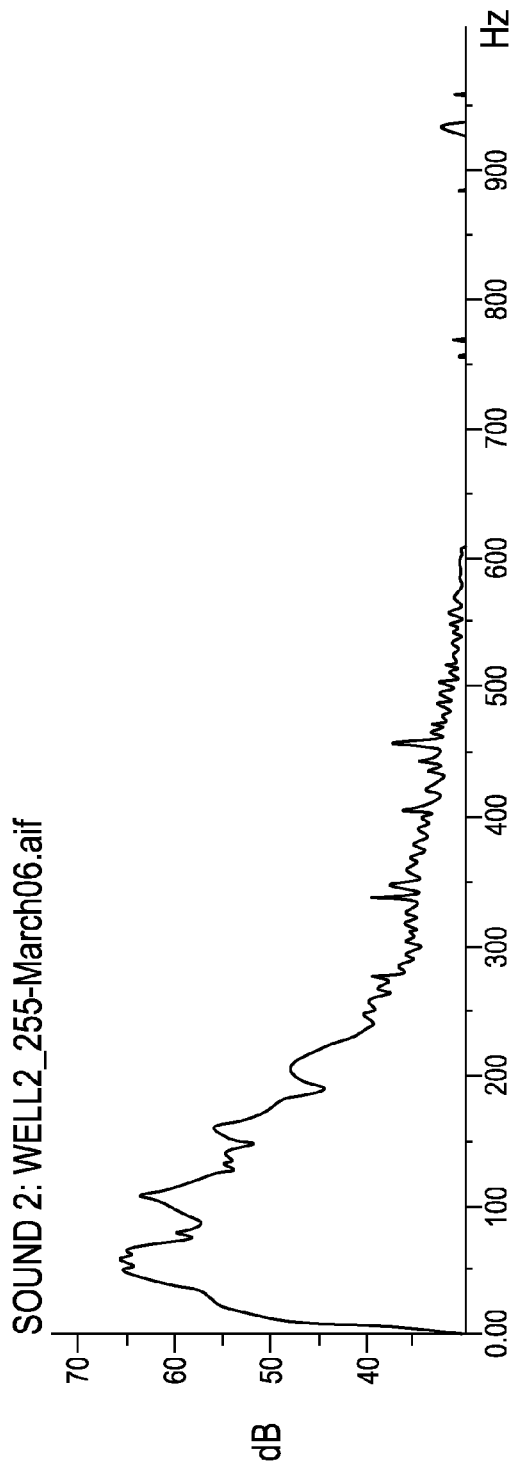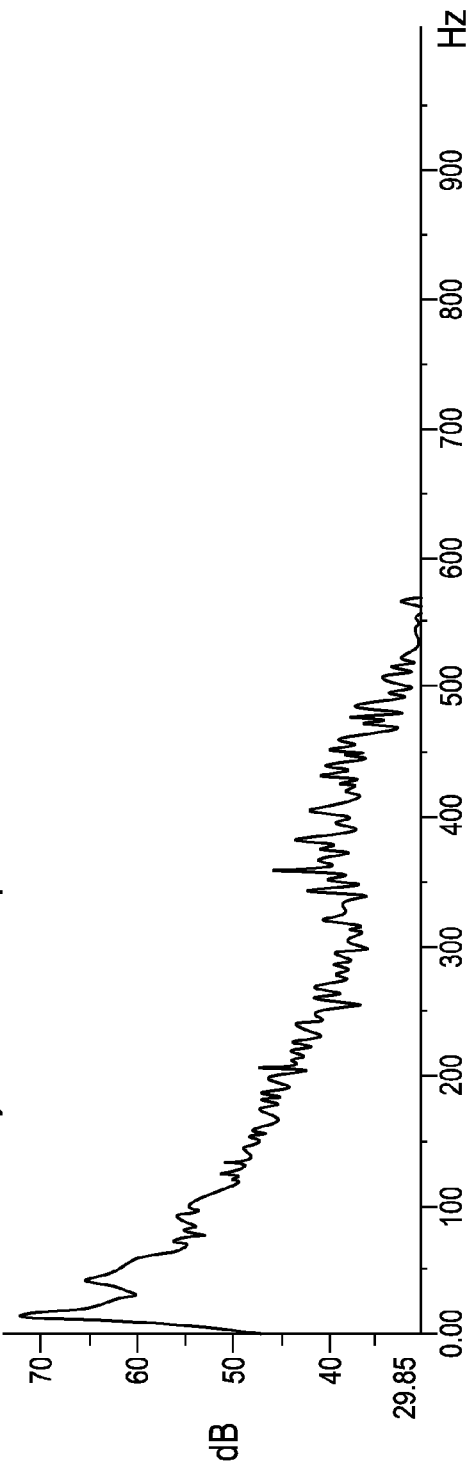
FIGURE 9 (part2)

COMPLIANT OCEAN WAVE MITIGATION DEVICE AND METHOD TO ALLOW UNDERWATER SOUND DETECTION WITH OCEANOGRAPHIC BUOY MOORINGS

CROSS REFERENCE TO RELATED APPLICATIONS

This application claims the benefit of U.S. Provisional Patent Application No. 61/201,011, filed on Dec. 5, 2008, the contents of which is hereby incorporated by reference as if set forth herein in its entirety.

FIELD OF THE INVENTION

The systems and methods described herein relate to oceanographic surface buoy systems to detect underwater sounds. In particular, the systems and methods described herein relate, among other things, to reducing flow noise associated with rapid vertical heave motions of an underwater listening device.

BACKGROUND

Endangered Northern Right Whales are struck by passing ships while sleeping (and breathing at the sea surface) at an alarming rate. The collisions frequently severely injure or kill the whales. The Northern Right whales are magnificent marine mammals that are large, rotund, black whales with large heads, long rostrums, and no dorsal fins. They can grow up to 53 feet (16.2 meters) long and weigh up to 70 tons. These Northern Right whale, prime target of commercial whaling in previous centuries, had to be placed on the endangered species list. Its population has been reduced in the Atlantic Ocean near the North American continent to about 300 and is still decreasing, now through ship strikes and fishing gear entanglement. Given this, every effort is being taken to protect these whales and give the still declining population a chance to stabilize and grow, and the systems and methods described herein will help to do this.

The Right Whales sleep (and breathe) while drifting at the sea surface and not infrequently get hit by passing ships which often inflict severe injuries or death. These collisions seem to indicate that the often considerable underwater noise generated by approaching vessels is unable to wake up sleeping right whales and entice them to get out of the path of the approaching ships. While awake the whales communicate actively with each other underwater with low frequency moaning sound bursts. To be able to listen from shore to the right whales' vocalization from adequately distributed underwater listening devices would allow researchers and observers to approximately know where the animals are located. Transiting vessels could be warned to change their course, lower their speed, and look out for whales resting in their paths to avoid collisions. Accordingly, it would be useful for researchers to conduct full-time monitoring of natural and man-made underwater noise with oceanographic buoy moorings Underwater sounds are typically received by an underwater listening device such as a hydrophone, which is typically installed as part of the mooring of an oceanographic surface buoy. The listening device is hard wired to a surface buoy, which transmits the noise to shore based researchers and observers. However, such transmission was only possible at calm sea state conditions and thereby limited to short-time observations. Most of the time wind generated waves are present at the sea surface, causing the surface buoy to follow the wave contours and thereby to raise and lower its mooring connection to the anchor. The vertical mooring motions generate flow noise around any object assembled as part of the buoy mooring. This flow noise masks underwater sound signals of interest and thereby hinders or greatly reduces their effective detection.

In buoy moorings the underwater listening devices (hydrophones) are installed inside of an open cage, with the cage being part of the buoy's mooring connection to its anchor on the sea floor. All offshore buoy moorings need to allow significant vertical and horizontal motions of the surface buoy, since the buoys are designed with sufficient buoyancy to follow the contours of the ocean waves which can be 30 ft or higher in storms depending on location. The wave generated buoy (or ship) motions are known as heave and surge (vertical and horizontal motions respectively). A sensor, for instance a hydrophone with its surrounding cage, connected to the surface buoy with a taut mooring cable will be rapidly lifted, lowered, and simultaneously more slowly oscillated sideways due to the constantly changing position of the contour of the passing by ocean waves, which the buoy is forced to follow. In particular the heave and drop motion can be quite rapid, reaching speeds of 1 to 1.5 meters/second (3 to 5 ft/second). When the hydrophone and its support cage are moved that rapidly through the water, a significant flow noise is generated around the hydrophone and its housing. This flow noise masks the environmental and man-made noises (including whale communications) in an area. In some situations, the hydrophone will only receiving and transmitting irregular water flow noise developed immediately adjacent to the sensor, which is stronger than the more distant whale vocalization and other sounds, unless there is a calm sea state and the sound sensor is near motionless in the water column.

Accordingly, there is a need for a system for reliably and continuously measuring underwater sounds independently of the prevailing sea state.

SUMMARY

The systems and methods described herein relate to a device which enables oceanographic surface buoy mooring systems to detect and monitor underwater noise at most sea state and weather conditions. In particular, the systems and methods described herein provide mooring systems that can support a hydrophone connected to a buoy located offshore in shallow and deep water positions. These mooring systems may enable the detecting and monitoring of underwater noises associated with, for example, whales and other aquatic creatures, weather/seismic events, anthropogenic marine activities, or any other underwater activities. As will be more fully described below, the mooring includes an expandable high-stretching tether cable/hose that reduces noise generated underwater when the buoy moves in response to wave and weather.

The device described herein also enables the surface buoy of such systems, through embedded electrical conductors linked to the buoy's transceiver, to provide real time or near real time transmission of underwater sound via radio, cell phone, or satellite link to shore observing stations. This systems and methods described herein expand the listening ability of oceanographic buoy mooring systems significantly since they eliminate or greatly reduce the vertical heave motions of the mooring near a hydrophone and its cage. These so improved buoy systems have now a near 24/7 all weather capacity to effectively listen to underwater sound in the vicinity of their locations and transmit it to shore by isolating the buoy's wave motions from the listening device installed in the buoy mooring.

The systems and methods described herein are directed to stretchable hose systems for use with a buoy mooring and underwater listening devices. For purposes of clarity, and not by way of limitation, the systems and methods may be described herein in the context of stretchable hose systems for connecting a surface buoy to a underwater listening device. However, it may be understood that the systems and methods described herein may be applied to provide for any type of high-stretch hose system. For example, the high-stretch hose system may have a working elongation of 30% and higher.

According to one aspect, a system for listening to underwater sounds is provided. The system includes a surface buoy configured to be disposed at a surface location on a water body. The surface buoy connects through an upper portion of its mooring to a subsurface buoy; the subsurface buoy connects to a lower portion of the mooring to the anchor on the sea floor to keep the system in position. The upper mooring consists of a high-stretching mooring tether connecting surface buoy and subsurface buoy. The lower mooring consists of an electromechanical cable or alternatively urethane potted chain connected with its upper end to the subsurface buoy, a hydrophone and hydrophone cage connected to the lower end of the electro-mechanical cable or urethane chain, and a chain section connecting the lower end of the hydrophone cage to a deadweight anchor. The hydrophone is deployed to listen to and record underwater sound, the sound signals are converted into electrical signals, the electrical data are transported through the electro-mechanical cable, the subsurface buoy and conductors inside the stretch hose to the surface buoy. In response to vertical and horizontal movements of the surface buoy at the surface location on the water body, the stretchable hose is configured to elongate and retract like a bungee-cord in its position between subsurface buoy and surface buoy, and keep the subsurface buoy and its lower mooring isolated from the vertical heave and drop motions of the surface buoy in waves. This creates an environment of very little motion of the listening hydrophone and the entire lower mooring, thereby maintain the subsurface buoy and hydrophone close to a predetermined depth in the water body.

In certain embodiments, the system includes an acoustic release device connected between the hydrophone and the anchoring member for allowing the hydrophone to separate from the anchoring member. The hydrophone may be electrically connected to the surface buoy. In some embodiments, the system may include a hydrophone cage for housing the hydrophone. The hydrophone cage may house a storage unit for storing data obtained by the hydrophone.

In certain embodiments, the system may include electrical conductors disposed within the stretchable hose and coupled to the hydrophone and the surface buoy. The electrical conductors may be disposed within the stretchable hose in a stretch-neutral configuration.

In some embodiments, the stretchable hose may be formed from a material capable of stretching to about twice its original length at its maximum working load. Optionally, the stretchable hose may be formed from a material capable of stretching from about 40 percent to about 200 percent of its original length. In certain embodiments, the stretchable hose may include a high stretching center section and a reinforced end section to allow for a gradual decrease in stretch from high strain under load in the center section. The stretchable hose may include a plurality of reinforcement bands organized into one or more layers. Optionally, the stretchable hose may include a plurality of layers of rubber and one or more layers of reinforcement bands. In some embodiments, the stretchable hose is pre-stretched to prevent at least a portion of the anchoring member from contacting a water body bottom surface. Optionally, the system may include a hose coupling attached to one end of the stretchable hose. In this embodiment, the stretchable hose may include one or more conductors, and the hose coupling may be configured to allow the one or more conductors to pass from the stretchable hose to an external interface without exposure to water.

According to another aspect, a method of manufacturing a system for listening to underwater sounds is disclosed. The method includes providing a stretchable hose with a first end and a second end, attaching the first end of the stretchable hose to a surface buoy configured to be disposed at a surface location on a water body, and attaching the second end of the stretchable hose to a hydrophone. The stretchable hose has an inner layer, at least one reinforcement ribbon having a plurality of cords embedded in a matrix and wrapped helically about the inner layer, and at least one conductor, wrapped helically about at least one of the inner layer and the at least one reinforcement ribbon. The conductor connects the first end and the second end

BRIEF DESCRIPTION OF THE DRAWINGS

The foregoing and other objects and advantages of the systems and methods described herein will be appreciated more fully from the following further description thereof, with reference to the accompanying drawings wherein:

FIG. 9 depicts charts that compare sound attenuation data at different frequencies of whale sound listening buoy mooring configurations shown in FIGS. 1A and 1B with the stretch hose system found in FIGS. 2 and 4.

DETAILED DESCRIPTION OF THE ILLUSTRATED EMBODIMENTS

This systems and methods described herein relate to a device which enables oceanographic surface buoy mooring systems to detect and monitor underwater noise at most sea state and weather conditions. In particular, the systems and methods described herein provide mooring systems that can support a hydrophone or other underwater listening devices connected to a surface buoy located at a deep or shallow-water offshore position. As will be more fully described below, the mooring includes an expandable tether cable/hose that reduces noise generated underwater when the buoy moves in response to wave and weather.

Figure 1A:
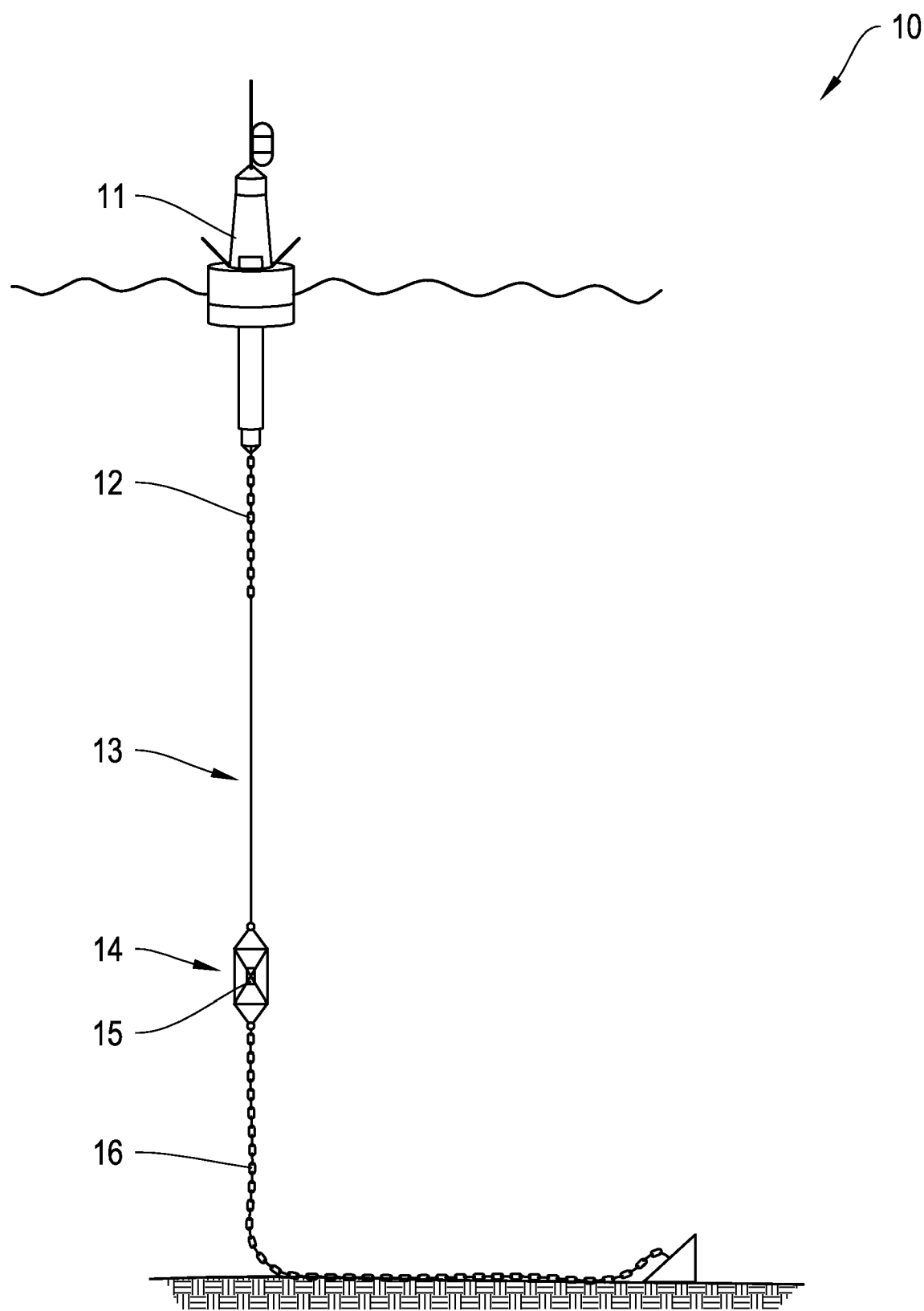
FIGS. 1A and 1B depict buoy moorings, according to an illustrative embodiment.
Figure 1B:
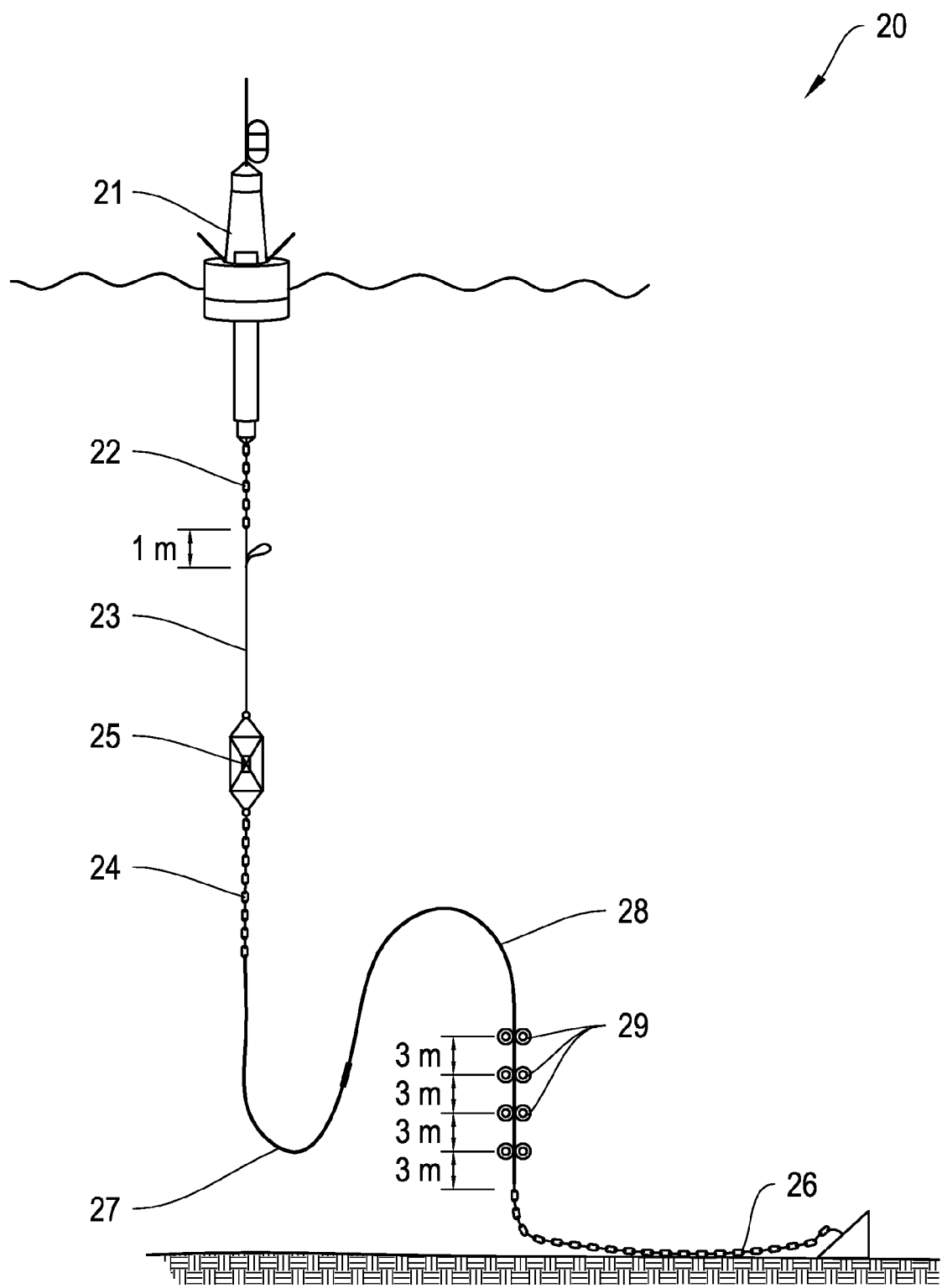

FIGS. 1A and 1B depict conventional hydrophone buoy systems 10 and 20 typically used for shallow water depths. In particular, FIG. 1A shows a system 10 for water depths up to 40 meters. System 10 includes a surface buoy 11, connecting to a urethane embedded chain 12 with an electrical conductor link. The urethane embedded chain link connects to an electro-mechanical cable 13, which couples to a cage 14 with the hydrophone element 15 inside. Below this cage is a length of mooring chain 16, which may be significantly longer than the vertical distance from the hydrophone cage termination to the sea floor. The surface buoy moves up and down in the sea state and is constantly adjusting the mooring length by raising or lowering sufficient chain length from or to the sea floor. Following the constantly oscillating sea surface contour the buoy raises and lowers its mooring and with it the hydrophone at considerable vertical speeds, measured up to several meters/second. This causes significant flow noise of the water passing by the hydrophone and its case which masks other noises like the whale vocalization noises and makes this configuration's main listening purpose and function limited except for times of calm sea state.

FIG. 1B depicts another buoy mooring system 20 for deployment in deeper water. In particular, FIG. 1-B depicts a surface buoy 21 that again couples to a urethane chain 22 and a conductor cable 23 with a coupling to the hydrophone 25. The hydrophone 25 connects to a length of chain 24 below. This chain 24 is connected to a length of heavier than sea water plaited nylon rope 27, which is spliced into a length of buoyant polypropylene rope 28, forming what is often called an S-tether configuration in the ocean at calm conditions. The bottom end of the polypropylene rope 28 connects to a length of marine chain 26 resting on the ocean floor. The chain is coupled into an anchor to keep the mooring on station. A series of plastic floats 29 are tied to the bottom end of the polypropylene rope 28, allowing it to lift the top section of the chain off the sea floor to avoid abrasive sea floor contact of the polypropylene rope 28 end.

The system 20 depicted in FIG. 1-B again is moving the hydrophone 25 and upper mooring elements up and down in sync with the surface waves, creating flow noise which masks the under water noise signals and makes acoustic signal detection severely compromised or impossible except under calm sea state condition.

The systems and methods described herein include a highly compliant tension member for use in oceanographic buoy mooring systems that isolates the large vertical and horizontal excursions and motions of the surface buoy from the hydrophone component of its mooring. The device avoids the rapid vertical motions—identified as heave motions—of a hydrophone assembly which is impossible to avoid using the buoy systems depicted in FIGS. 1A and 1B. These heave motions create a "whooshing" noise that swamps out other acoustic signals, and are undesirable for underwater acoustic sensors. In particular, and as described with reference to FIGS. 2-8, the system employs a highly extendable reinforced rubber hose, which can accommodate the constantly changing vertical distance between the ocean waves riding surface buoy and the lower portion of the mooring connection and the buoy's anchor on the sea floor by stretching or retracting its length. In addition this rubber hose accommodates reliable electrical conductor and optical light-guide path linkage between the surface buoy and sensors below the hose, thereby enabling radio-link or satellite transmission of acoustical and other sensor reception to shore stations, or transmission of sensor control commands from a shore station via the surface buoy. The combination of a low motion environment for the sensor and the system's ability to communicate its signals to or from shore reliably to its sensors marks the greatly improved utility of this buoy system to work as effective acoustic listening device.

Figure 2:
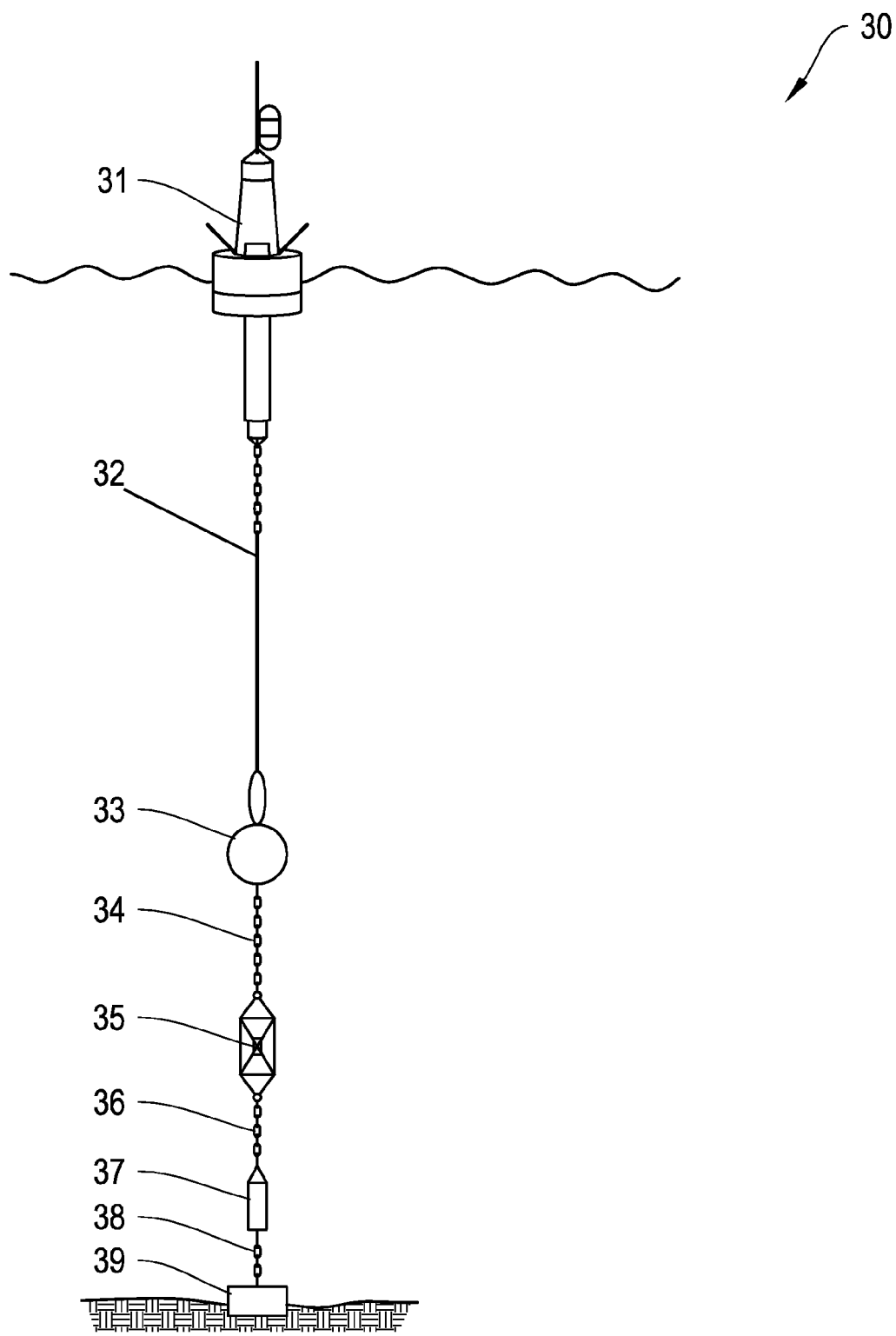
FIG. 2 depicts a buoy mooring have a stretchable hose, according to an illustrative embodiment.

FIG. 2 depicts a buoy mooring system 30 according to an illustrative embodiment. As shown, the hydrophone and hydrophone cage are positioned below the depicted subsurface buoy and connected to this depicted subsurface buoy via a short urethane conductor chain and an electro-mechanical cable. The connection between the surface buoy and the subsurface buoy is the stretch hose. In particular, system 30 includes a surface buoy 31 that connects through a high stretch tire cord reinforced rubber hose 32 with embedded conductors to a hydrophone 35, such as a CR series hydrophone, manufactured by Cetacean Research Technology, located in Seattle, Wash. Below a subsurface buoy 33 is a taut mooring to the anchor 39. The upper portion of this taut subsurface buoy mooring consists of a potted chain length with an embedded conductor cable 34, which is connected at its lower end to an open hydrophone cage 35. Beneath the hydrophone cage 35 is a chain section 36 which connects to an acoustic release device 37. The release device 37 separates the mooring from its anchor 39 and a chain section 38 through a coded acoustic signal from a ship, allowing easy recovery of the buoy system. Both chain 38 and anchor 39 may be left behind when the system is retrieved.

The length of stretchable hose 32 is selected to be sufficiently stretchable to allow the surface buoy to be carried over the highest ocean waves observed or possible at a selected location, which can be 10 meters or higher in completely exposed locations or less in semi-sheltered areas of the ocean. The cable will elongate allowing the buoy to ride on the surface of these waves and reducing the pull of the buoy through the air/sea interface. This in turn reduces the amount of noise generated at the air/sea interface by the buoy and reduces the background noise that can interfere with the hydrophone as it detects marine, animal noises. Also shown in FIG. 2 is the subsurface buoy 33, which in some embodiments may include a steel sphere. The subsurface buoy 33 couples to one end of the stretchable hose 32. The subsurface buoy acts as a massive body that provides inertia to the system and reduces the ability of the surface buoy to move the lower end of the stretchable cable 32. In some embodiments, the subsurface buoy 33 tensions and stretches the lower mooring held by the anchor, and therefore is held in the same altitude above the sea floor. In these embodiments, the subsurface buoy 33 may serve as the quasi fixed end of the stretchable cable 32, while the upper end follows the motions of the surface buoy 31. The conductor urethane chain 34 is a short length of chain that couples the subsurface buoy 33 to the hydrophone cage 35. In this embodiment the hydrophone cage 35 includes a temperature sensor as well and it will be apparent to those with skill in the art that other instruments may be attached to the cage to collect other kinds of data such as the saline content, measures of ambient light, measures of plankton, and other measures that might be of interest to a scientist.

Below the hydrophone cage 35 is a short length of mooring chain 36 coupled to an acoustic release element 37. In some embodiments, the mooring chain 36 is about 1.7 meters long. The acoustic release element 37 such as the one depicted in FIG. 2 responds to an acoustic signal to release itself from the mooring chain that couples to the sacrificial anchor. This allows for the release of the surface buoy from the sacrificial anchor and makes it possible to collect the hydrophone and/or the upper portion of the buoy mooring along with any data that may have been stored therein. In certain embodiments, the hydrophone cage 35 may include a hard drive or other memory system that is capable of collecting information generated by the hydrophone. In alternate embodiments, the hydrophone couples to an amplifier that sends signals through the electrical conductors in the stretchable hose that couples to the surface buoy. At the surface buoy a set of transmitters may be provided that will transmit out data representative of the presence of marine life in the local environment. This data may be broadcast to ships in the vicinity thereby providing a warning to ships in the vicinity of mammal life, such as the presence of Northern Right whales. This can allow the local ships to avoid striking the Northern Right whales and thereby reduce fatalities of the species. Further, alternatively and optionally, the hydrophone cage 35 may include a hard drive for recording all the acoustic signals detected during a time period, such as one month, during which the hydrophone operates. Thus the buoy system depicted in FIG. 2 may be periodically dropped by a research vessel and retrieved by activation of the acoustic release so that the data and instruments may be recovered.

The system in FIG. 2 can be one of several buoys that are set up in an area to provide area monitoring of marine animals, submarines, marine industrial operations, or other underwater activities. The buoys can be set up over a large area so that a number of hydrophones are positioned across the area of interest. Each hydrophone is an underwater listening device that detects sounds in the water and converts the acoustic energy into electrical energy. Hydrophones listen to sounds in the sea, but do not transmit any sound, making them passive listening devices. Most hydrophones are made from a piezoelectric material. This material produces small electrical charges when exposed to pressure changes. The pressure changes associated with a sound wave can be detected by a piezoelectric element. Under the pressure of a sound wave, the piezoelectric element flexes and in return gives off electrical signals. These electrical signals can be recorded and later analyzed with computer programs. Some hydrophones are omni-directional and record sounds from all directions with equal sensitivity. Other hydrophones, called directional hydrophones, have a higher sensitivity to signals from a particular direction. Directional hydrophones are typically used in systems for locating and tracking objects. Any type of hydrophone can be used with these buoy systems and the type used will depend upon the application being addressed.

In certain embodiments, the overall mooring length is kept shorter than the water depth at the site and the hose 32, once deployed, may be deployed in a pre-stretched condition. The pre-stretch may keep the entire mooring taut except for allowing a selected small amount of slack when the surface buoy rides through the trough of large storm waves. In other embodiments, the overall mooring length may be about the same or greater than the water depth at the site, but the bottom mooring segments of such systems may be subject to periodic and/or continuous abrasive sea floor contact. In certain embodiments, the hose 32 length and its stretch is selected to allow the surface buoy 31 to rise to the top of the highest ocean waves in a given location, and to allow lateral mooring excursions caused by lateral drag resistance forces on the mooring and surface buoy 31 and wind drag forces on the buoy 31 without overstretching the hose.

The mooring forces and force fluctuations under normal and worst weather conditions at a selected mooring location may be determined with advanced time domain numerical modeling programs for a specific buoy system and the environmental conditions at the site it has to operate. Such programs may predict the tensions at different positions along the mooring due to known or assumed current profiles. The hose design strength and stretch may be selected to support the maximum bad weather tensions and extensions of the system within its working load and working stretch range and a sufficient safety factor for long-term survival. The hose design and selected hose length may allow its stretch and strength to be adapted to fit the mooring needs and optimize its performance. For example, a typical hose 32 may stretch to over twice its original length at its maximum working load. The tensions in other portions of the buoy mooring are also determined through the modeling process, thereby allowing selection of mooring hardware to support the mooring loads with sufficient factors of safety. The adaptable mechanical properties of the hose element allow optimization of the design and performance of surface buoy mooring systems to the local conditions (water depth, ocean currents, prevailing sea states and wind) at a site. It will be understood by one of ordinary skill in the art that the systems and methods described herein can be modified for other suitable applications and that such other additions and modifications will not depart from the scope hereof.

Figure 3:
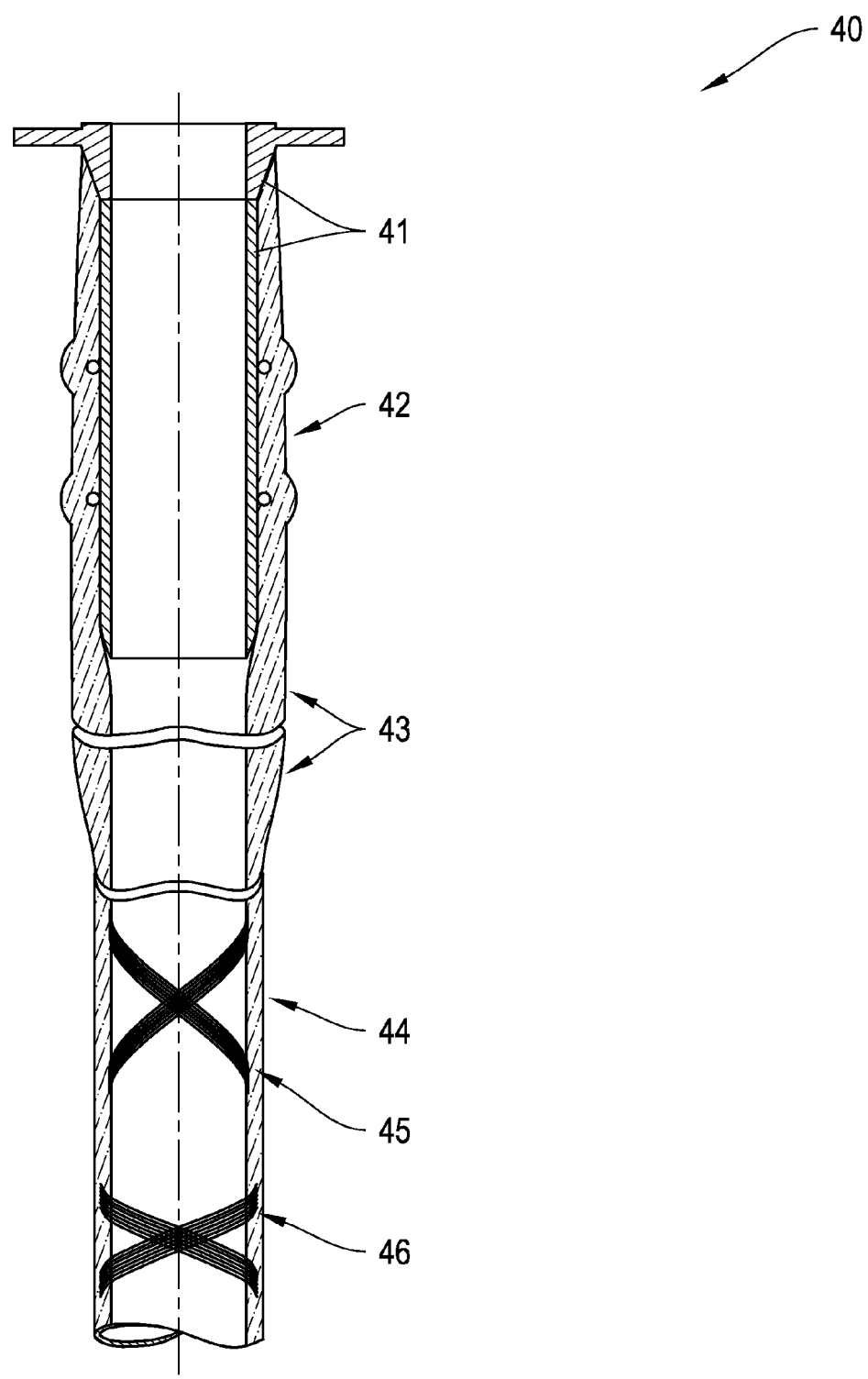
FIG. 3 is a cross-section view of a stretchable hose, according to an illustrative embodiment.

The stretchable hose 32 may include a long high stretching center section, hose end couplings, and extra reinforced end sections next to each hose end coupling. Conductors may be embedded into the hose walls and arranged in a stretch neutral geometry. FIG. 3 depicts a cross-section view of a stretchable hose 40 (similar to hose 32 in FIG. 2), according to an illustrative embodiment. The hose 40 includes an inner rubber liner, as part of the hose wall, one or more counter-helically butt-wrapped layers of nylon tire cords 45 serving as reinforcing strength members, one or several layers of electrical conductors and/or optical light guides, applied with a stretch neutral helix angle, and one or more counter-helically wrapped layers of Kevlar® tire cord 46 to protect the hose against fish-bite, also applied with a stretch neutral wrap angle. In some embodiments, the hose 40 includes an outer rubber jacket 44.

The hose design and its terminations as described herein may be designed and built for the purpose of being a highly compliant strength member and conductor carrier, not as merely a flexible conduit connection to transport materials, fluids, and gases. The strength member may have adaptable load elongation behavior, requiring the use of structural textile mechanics calculations to customize a hose design and closely predict its stretch, and torque and rotation behavior under load. A hose design is selected as a tension member, not merely a stretchy fiber rope with incorporated conductors, or a non-stretching electro-mechanical cable. The hose 40 is to have substantially high stretch levels of typically 100 to 200 percent at break to accommodate the ocean wave heave motion of a surface buoy within its working elongation in any water depth, and allow a dependable way to accommodate embedded electrical and optical conductors into the hose body which function reliably despite the large stretch deformations of the hose body in use. Moreover, hoses for mooring applications should be strong enough to support significant mooring tensions.

Hoses and other flexible connectors and/or tension members such as lines, cords, and ropes generally have inversely-related strength and stretching characteristics. For example, a connector/tension member that has a high breaking strength tends to stretch very little before breaking, whereas a connector/tension member that stretches a lot before breaking tends to have a low breaking strength. Table 1, below, tabulates some estimated breaking strengths and stretching characteristics for a number of flexible connectors/tension members.

TABLE 1

Bbreaking strength and stretch at break and at maximum workload of buoy mooring elements.

| Mooring Element | Breaking Strength in lbs | Elongation in % at Break/Max. Workload |
|---|---|---|
| Rubber Tether* | ~500 lbs | Up to 500/200 |
| Rubber Hose | 2,000 to 20,000 lbs or multiple | Up to 200/170 |
| Nylon Rope*) | 25-30,000 lbs | 30-50/10-20 |
| Wire Rope | 60-80,000 lbs | 1-2/1 or less |
| Kevlar/Vectran/ UHMW PE Rope | 80-120,00 lbs | 2-4/2 or less |

*Note:
Rubber tether and rope strengths are for 1" diameter size. Rubber hose outer diameter is typically 2" and larger for strengths above 4,000 lbs.

As Table 1 indicates, a tether made of a highly-stretchable material such as rubber is capable of elongating up to 200% at maximum workload, or up to 500% before breaking Rubber can typically endure large stretch cycles for long periods of time without losing significant retraction capability. However, rubber is weak in tension; its elastic modulus up to this elongation is 210 to 300 psi, and a 1" diameter rubber tether only has a breaking strength of about 500 lbs. A mooring tether would need to support typical mooring tensions in the approximately 1,000 to 10,000 lbs range without breaking. On the other hand, a rope made from a para-aramid synthetic fiber such as Kevlar® has a breaking strength of 80,000-120,000 lbs, but will only stretch about 2% at maximum workload, or 2-4% before breaking. Hence, a connector/strength member structure having both high stretchability and high breaking strength (e.g., a structure with the stretchability of rubber but a significantly higher breaking strength) would be very desirable for mooring applications.

Figure 4:
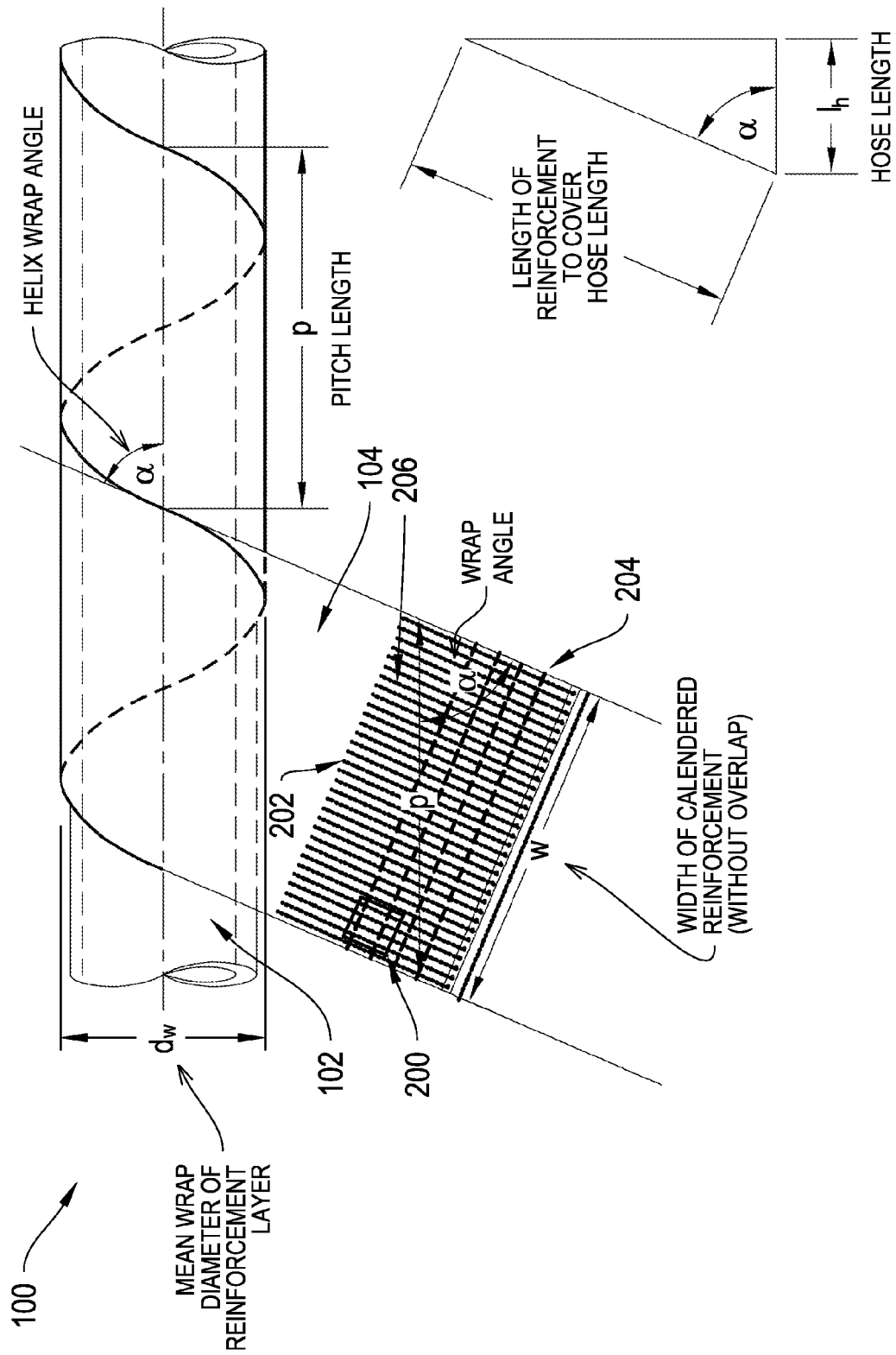
FIG. 4 depicts a diagram of a stretchable hose system, according to an illustrative embodiment.
Figure 5:
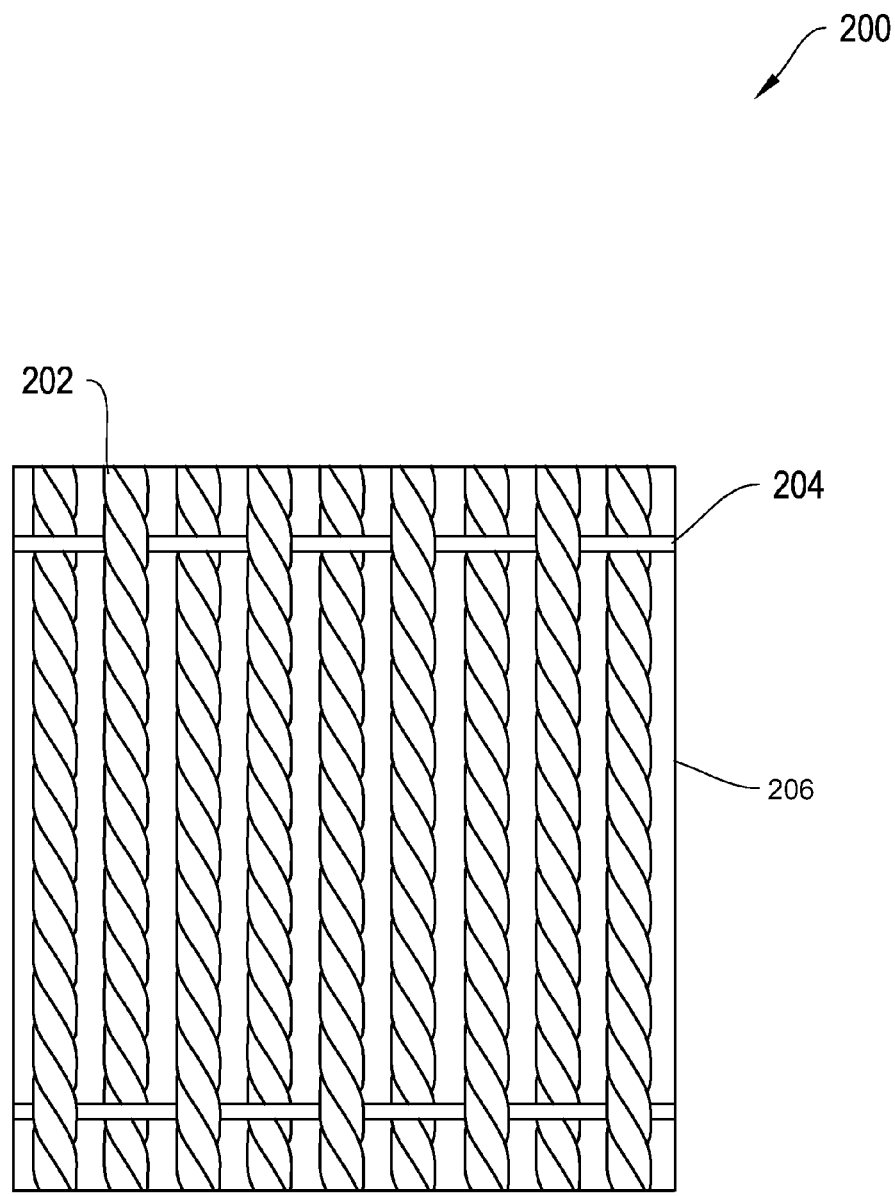
FIG. 5 depicts a portion of a reinforcing band, according to an illustrative embodiment.

Standard woven nylon tire cord fabric may be used to increase the strength and limit the extension of a rubber mooring hose. A woven nylon cord construction for reinforcing tires and hoses has a breaking strength of about 1,000 lbs per inch width, and is encapsulated in a thin rubber sheet (e.g., 206, FIGS. 4-5), typically but not limited to 0.032 inch thickness, to prevent uneven spacing of the loose weave and abrasion between cords. Its stress at break is about 31,250 psi., compared to 270-420 psi of rubber stress at 200 percent stretch. The weave may consist of about 30 small parallel nylon cords (e.g., 202, FIGS. 4-5) per inch, kept in place and substantially evenly spaced by thin and weak cotton web yarns (e.g., 204, FIGS. 4-5) which are positioned typically about ½ inch apart. Woven cord with lower cord counts may also be used, if hose tensions have to be kept deliberately lower, or the cord size changed to accommodate different strength needs. An example of a woven cord fabric is shown in FIG. 5, discussed in further detail below.

The open woven cord "fabric", furnished with a rubber-friendly adhesive coating developed for tire reinforcement, may be embedded inside a thin rubber sheath, typically but not limited to 0.032 inch thickness. The soft un-vulcanized rubber covers the fabric, and, in certain embodiments, may also encapsulate individual cords entirely, depending on the inter-cord spacing. For example, if the inter-cord spacing is large enough, rubber may infiltrate between adjacent cords to encapsulate each individual cord entirely. The reinforced rubber sheath is sliced into ribbons of precise width, where the nylon tire cords run parallel to the ribbon length. These reinforced ribbons may form the main strength members of the hose. In certain embodiments, they are butt-wrapped counter-helically around the inner rubber hose liner or already applied cord layers (see, e.g., FIG. 4). The butt-wrap of a ribbon of known width over a known diameter of the underlying hose body gives a substantially constant wrap angle with close tolerances. In certain embodiments, the larger the wrap angle of the reinforcement ribbons, the higher their structural elongation, or the easier the ribbon is to extend (like the slinky effect of a telephone hand set cord), and the assembly can be elongated more at a selected tension. However, this can come at the price of a lower contribution of the ribbon's strength to the hose strength due to the steep angle of the tire cord axes to the hose axis. If, alternatively, the wrap angle of the ribbons relative to the hose axis is lowered and the ribbons wrap around the hose body closer to the direction of the hose axis, they contribute a significantly higher portion of their strength to the hose load. However, this helical ribbon configuration contributes only a small amount of structural elongation and thereby reduces the overall hose elongation available. If higher strength at a required elongation—or wrap angle—is needed, additional layers of rubber covered reinforcement ribbons can be added at the same wrap angle, or a larger hose diameter can be selected. In some embodiments, the overall stretch for a mooring in a given location may be obtained by increasing or shortening the hose length, in addition to modifying the wrap angle of the hose.

In certain embodiments, the hose, when used as a mooring tether for the buoy system in FIG. 2, provides a combination of adaptable high stretchability and strength. The tire-cord reinforced rubber hose design of systems described herein provides this combination of properties, and allows in addition the embedding of suitable electrical and optical conductor assemblies. Conductor survivability in the ocean's dynamic surface wave zone is difficult, which the hose design disclosed herein enables. In certain embodiments, the conductor assembly's survivability is made possible by its arrangement in a stretch-neutral configuration which does not stretch or compress the conductor lengths beyond their approximately 0.5 percent elastic elongation limit.

In certain embodiments the stretchable hose system includes an inner liner layer formed into a tube, with a first reinforcing band wrapped around the inner liner layer in a first helical direction with a first wrapping angle to the axial direction of the inner liner layer tube. FIG. 4 depicts a diagram of a stretchable hose system 100, according to an illustrative embodiment. The stretchable hose system 100 includes an inner liner layer 102 formed into a tube and a first reinforcement band 104. The reinforcement band 104 may include a series of reinforcing cords 202, a flexible matrix 206, and cross-woven structures 204. These structures are discussed in further detail with relation to FIG. 5, below, which depicts a portion 200 of reinforcement band 104. In some embodiments, a second reinforcement band may be spiraled in the opposite direction to achieve torque balance. This second reinforcement band may be separated from the first reinforcement band 104 by one or more rubber separation layers. Optionally, a third, fourth, or even more reinforcement bands may be included to provide further tensile strength. In certain embodiments, there may be one or more other liner layers between the inner liner layer 102 and the reinforcement band 104 to provide further reinforcement. The stretchable hose system 100 is a matrix of reinforcement bands and rubber layers that may be selected to result in hose elongations at break between about 40% of its original length to about 200% of its original length.

The first reinforcement band 104 wraps around the exterior of inner liner layer 102 in a first helical direction with a first wrapping angle α, as shown in FIG. 4. The first reinforcement band 104 may run continuously from one end of the hose end to the other end, and may transfer its tension to hose couplings at each end. The first wrapping angle .alpha., and other wrapping angles, measured between the longitudinal direction of the reinforcement band 104 and the axial direction of the tube formed by the inner liner layer 102, or the hose axis. The first wrapping angle .alpha. determines in part the stretching characteristics of the stretchable hose system 100 and/or the hose breaking extension, and is discussed in more detail in relation to FIG. 6.

As mentioned above, in certain embodiments, the stretchable hose system 100 may include a second reinforcement band that wraps around the inner layer 102 and the wrapped first reinforcement band 104 in a second helical direction, opposite to the first helical direction of the first reinforcement band 104, with a second wrapping angle. Optionally, the stretchable hose system 100 may include third, fourth, and other reinforcement bands that wrap helically around the inner liner 102, the first reinforcement band 104, and the second reinforcement band. The helical wrapping directions of successive reinforcement bands may alternate, with odd-numbered bands (first, third, fifth, etc) wrapping in one direction and the even-numbered bands (second, fourth, sixth, etc) wrapping in the opposite direction, but alternate embodiments may be envisioned where the helical wrapping directions do not alternate with successive bands, or alternate in some other fashion. In some embodiments, successive reinforcement bands may be applied after a rubber separation layer is added over the first layer or layers of reinforcement bands, wrapped in the same or different helical direction of the previous band. This may prevent abrasive damage between contacting reinforcement bands of opposite twist directions. In all of the above embodiments, wrapping angles may be the same across all reinforcement bands, or may vary individually, in order to achieve the desired stretching characteristics and/or to result in a hose body with minimum rotation and torque development under load. Optionally, the number of reinforcement bands used may vary across the length of the hose system. For example, more reinforcement bands may be used near hose couplings in order to provide more reinforcement at the coupling points. This may help the hose body resist damage due to friction with hose coupling components, by reducing the hose elongation near the coupling components.

The stretchable hose system 100 may also include conductors 106. These conductors 106 may be electrical and/or optical conductors, and are also helically wrapped around the inner layer 102. In some embodiments, the conductors 106 may be wrapped in between successive reinforcement bands, or may be wrapped around the hose just within the cut-protection layer. In some embodiments, the conductors 106 may be wrapped over the reinforcement bands, and may be enclosed by rubber bedding layers. The conductors are preferably helically wrapped with wrap angles large enough to be stretch neutral, such that even at full hose extension, the conductors are not damaged by exceeding their approximately 0.5 percent elastic elongation limits. These stretch-neutral wrap angles may differ from the wrap angles used for the reinforcement bands.

FIG. 5 depicts a portion 200 of the reinforcing band 104 shown in FIG. 4, according to an illustrative embodiment. As described above, the reinforcing band 104 may comprise a series of reinforcing cords 202 disposed in a single layer, substantially parallel to each other. In certain embodiments, each reinforcing cord is encapsulated in rubber. In some embodiments, each reinforcing cord 202 is not directly adjacent to neighboring cords, but rather is evenly separated from neighboring cords by a gap. Reinforcing cords 202 may be further linked by cross-woven structures 204, and may further be disposed in a flexible matrix 206. Reinforcing cords 202 are flexible and may be able to stretch to some degree without undue damage to cord structure. For example, reinforcing cords 202 may comprise nylon tire cords, polyester tire cords, para-aramid synthetic fiber cords, or some combination of the foregoing or any other suitable cord, rope, or fiber. In some embodiments, the reinforcing cords 202 are made from industrial grade nylon fibers which stretch about 20% at break. In alternate embodiments, reinforcing band 104 comprises multiple layers of reinforcing cords 202. Cross-woven structures 204, fabricated of materials such as cotton weft or web yarn, are also flexible, and may provide transverse support to reinforcing cords 202, as well as keeping adjacent cords from touching in certain embodiments. The cross-woven structures 204 may be woven in a direction perpendicular to the wrap direction over and under the reinforcing cords 202 to form a loose fabric. In some embodiments, the cross-woven structures 204 may be designed to provide sufficient spacing for effective rubber encapsulation of the reinforcing cords 202. Flexible matrix 206 assists in forming the structure of the reinforcing band 104, as well as providing structural and/or shape support for reinforcing cords 202 and cross-woven structures 204. The flexible matrix 206 may also prevent inter-cord contact and/or cord-to-cord abrasion. In certain embodiments, flexible matrix 206 is formed at least partly from rubber, some other flexible material, or a combination thereof. For example, flexible matrix 206 may be a thin rubber sheath of about 0.032 inch thickness. In some embodiments, the material for flexible matrix 206 is selected to provide high adhesion with the reinforcing cords 202 and/or the cross-woven structures 204.

The inner liner layer 102, as mentioned above, is fabricated from flexible and stretchable rubber compound materials selected to be compatible with the selected fill fluid in its use. The outer liner rubber compound may be selected to provide compatibility with sea water and with sunlight. Reinforcing bands 104 and cords 202 may be fabricated from a flexible material that is less stretchable than the materials used in the inner liner layer 102, the flexible matrix 206, and/or the outer liner rubber compound, but significantly stronger. Thus, the angle at which the reinforcing bands 104 and cords 202 are wrapped around inner liner layer 102 determines in part the overall stretching characteristics of the stretchable hose system 100. If a wrapping angle of zero is used, where the reinforcing bands 104 and cords 202 are parallel to the hose direction, the stretching behavior of the hose may be limited by the stretch at break of the reinforcing bands 104 and cords 202. As the wrapping angle increases, the stretching characteristics of the hose system changes as a function of the combination of at least the inner layer 102 and the reinforcement cords 202 and the reinforcement cord layer geometry.

Figure 6A:
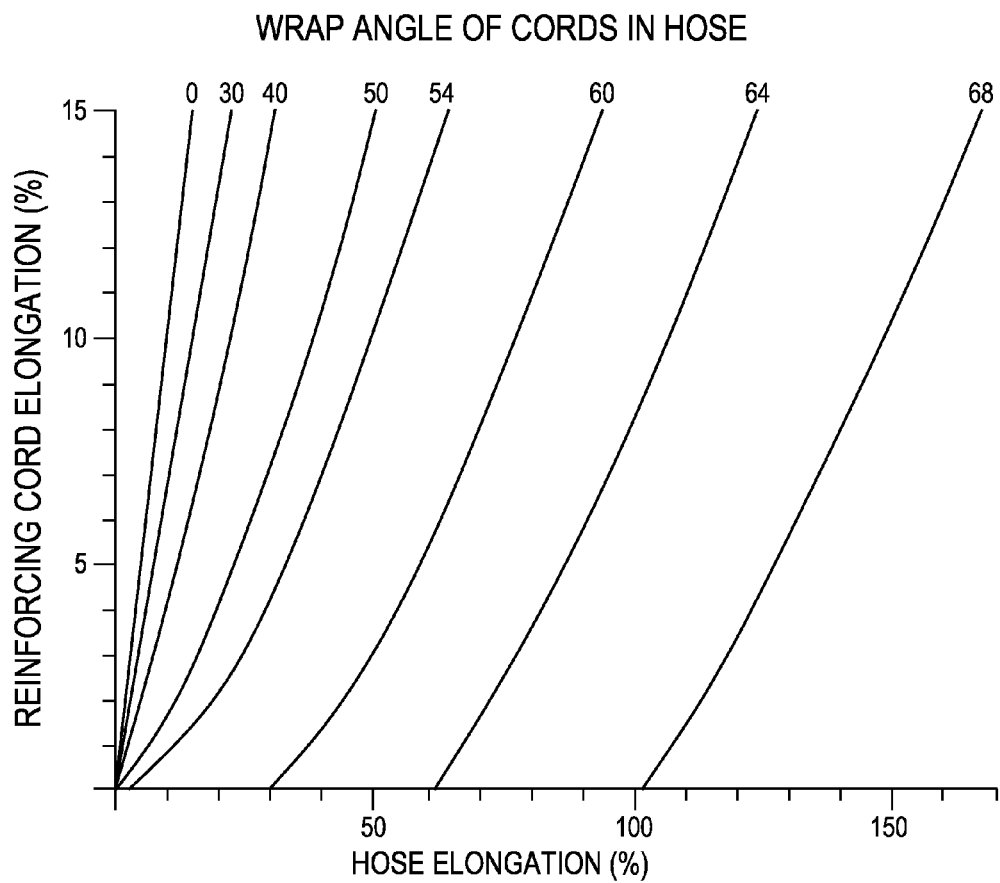
FIG. 6A is a chart depicting the relationship between reinforcing cord elongation, hose elongation, and reinforcing cord wrapping angle, according to an illustrative embodiment.

FIG. 6A is a chart depicting the relationship between reinforcing cord elongation, hose elongation, and reinforcing cord wrapping angle, according to an illustrative embodiment. FIG. 6A shows the elongation of nylon tire cord tension members up to 15% in the elongated hose for different wrap angles of the counter-helically wrapped reinforcement bands. (Note that the cords break at about 20% elongation, more than the 15% shown in FIG. 6A.) As the wrap angle becomes steeper, the hose elongation at which the tire-cords leave their buckled untensioned condition and start to pick up load become larger. For instance with a wrap angle of 60 degrees in, the cords pick up tension at 30% hose elongation, and will break when the hose has elongated 100%. When the wrap angle is selected as 68 degrees, the cords pick up tension at 100% hose elongation, reach their maximum workload at about 140% elongation, and fail the hose at about 180% elongation, since the cords have reached their breaking elongation at this point. FIG. 6A only shows the elongation of the reinforcing tire cords in the hose depending on the wrap angle of the reinforcing bands. It does not show the rubber tension, reinforcement tension, and overall hose tension of a specific hose.

Figure 6B:
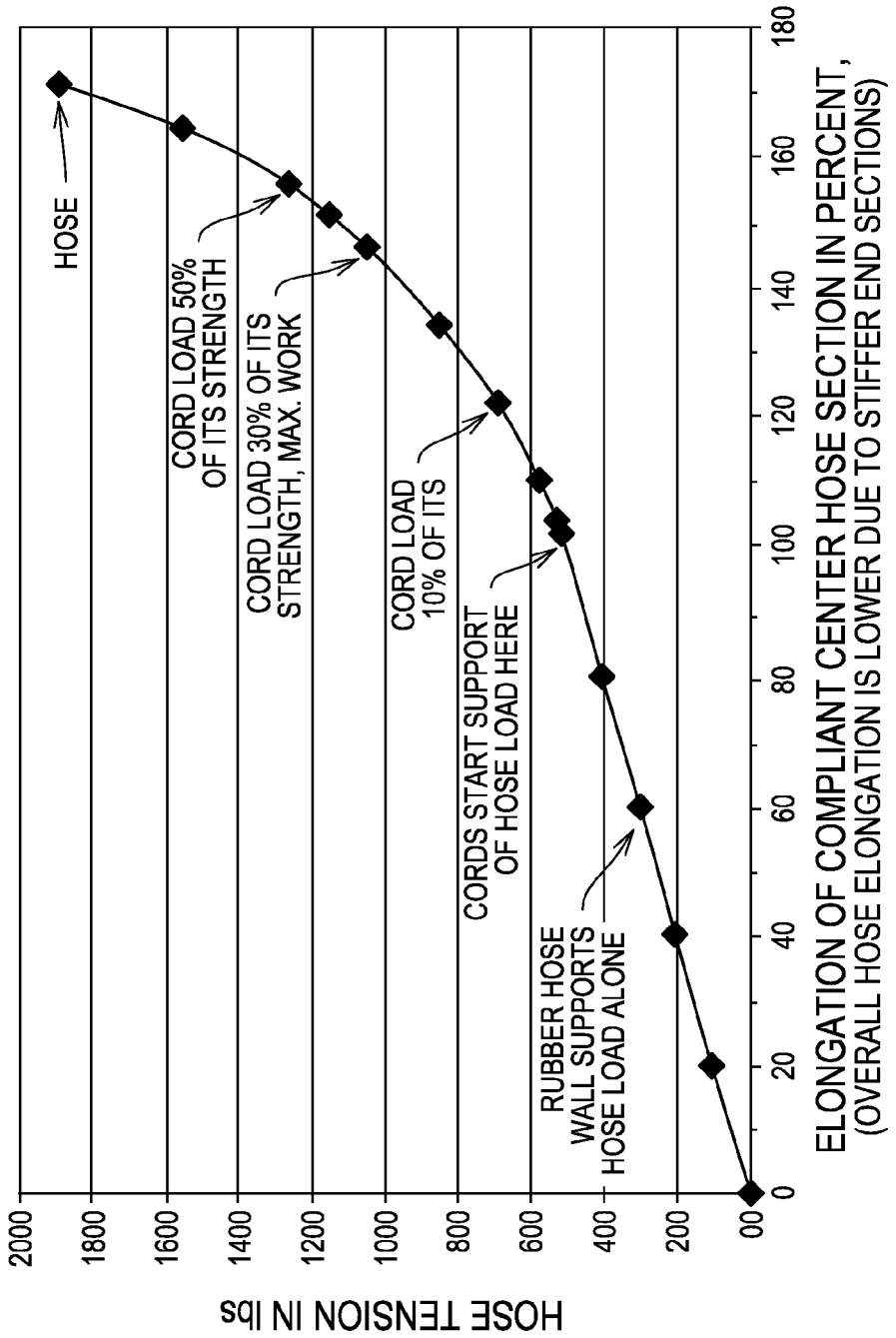
FIG. 6B is a chart depicting the stretching behavior of a stretchable hose, according to an illustrative embodiment.

FIG. 6B is a chart depicting the stretching behavior of a stretchable hose, according to an illustrative embodiment. The stretchable hose depicted is designed to have approximately the following behavior through the geometry and construction of the reinforcing bands and the load carrying cross section of the hose wall: At ~500 lbs tension the hose stretches about 100 percent, and the tire-cords start to pick up tension. When the hose is stretched 140 percent (it has now nearly 2.4 times its original fabricated length), its has stretched its nylon tire cord reinforcement to ⅓ of its breaking strength, and the hose tension is ~1,200 lbs, its maximum working load. At about 170 percent elongation the calculated hose load passes 1800 pounds and the tire cord reinforcement has likely reached its breaking strength. The hose may fail at this point since the rubber wall alone carries only a portion of the hose load.

It is to be understood that the calculated load elongation behavior shown in FIGS. 6A-B are only approximate due to the time and elongation speed dependent loading and unloading response of rubber and textile tire cords, the load and stretch response in addition depend on the hose's loading and storage history. Small manufacturing variations of tire cord strength and stretch behavior are amplified due to the tire cord's tightly spiraled arrangement in the hose wall, adding more variation to the actual hose stretch response. However the agreement between calculated and actual load-elongation behavior is fairly close and consistent. Hoses of this embodiment are typically deployed with 15 to 30 percent pre-stretch in order to keep the mooring taut. When retrieved after 3 to 10 months at sea, the hoses may typically measure 15% longer than their as-built-length, however the hoses typically retract closely to their as-built length after a few days or weeks in storage on-shore.

In certain embodiments, the systems described herein may be configured and expanded to create large hoses where the design strength reaches considerably higher strengths without reducing the stretchability—and thereby the capability of such hose design to accommodate large wave excursions within its working stretch limits. In some embodiments, these hose designs may support higher tension levels within their working stretch limits, thereby allowing the use of larger buoys or deployment of mooring systems in deeper water or areas with higher loads from stronger ocean currents. Such hoses may also find potential other offshore applications as wave or stretch mitigation.

Referring back to FIG. 3, the hose 40 also includes a coupling 41, which may be a modified design from the standard weld-neck design shown here, used in commercial pressure and suction hoses. The modified design, shown in FIG. 7, in addition to its normal function of tension transfer from the reinforcing bands of hose 40, may allow the conductor to be guided out of the hose body without sea water exposure and also provide a customized fit to the buoy's reinforcement strength members and connecting hardware interfaces. Avoiding conductor exposure to seawater greatly improves conductor reliability and life expectancy. The hose couplings may be made of metal or any other solid, rigid material suitable for maritime usage.

Figure 7:
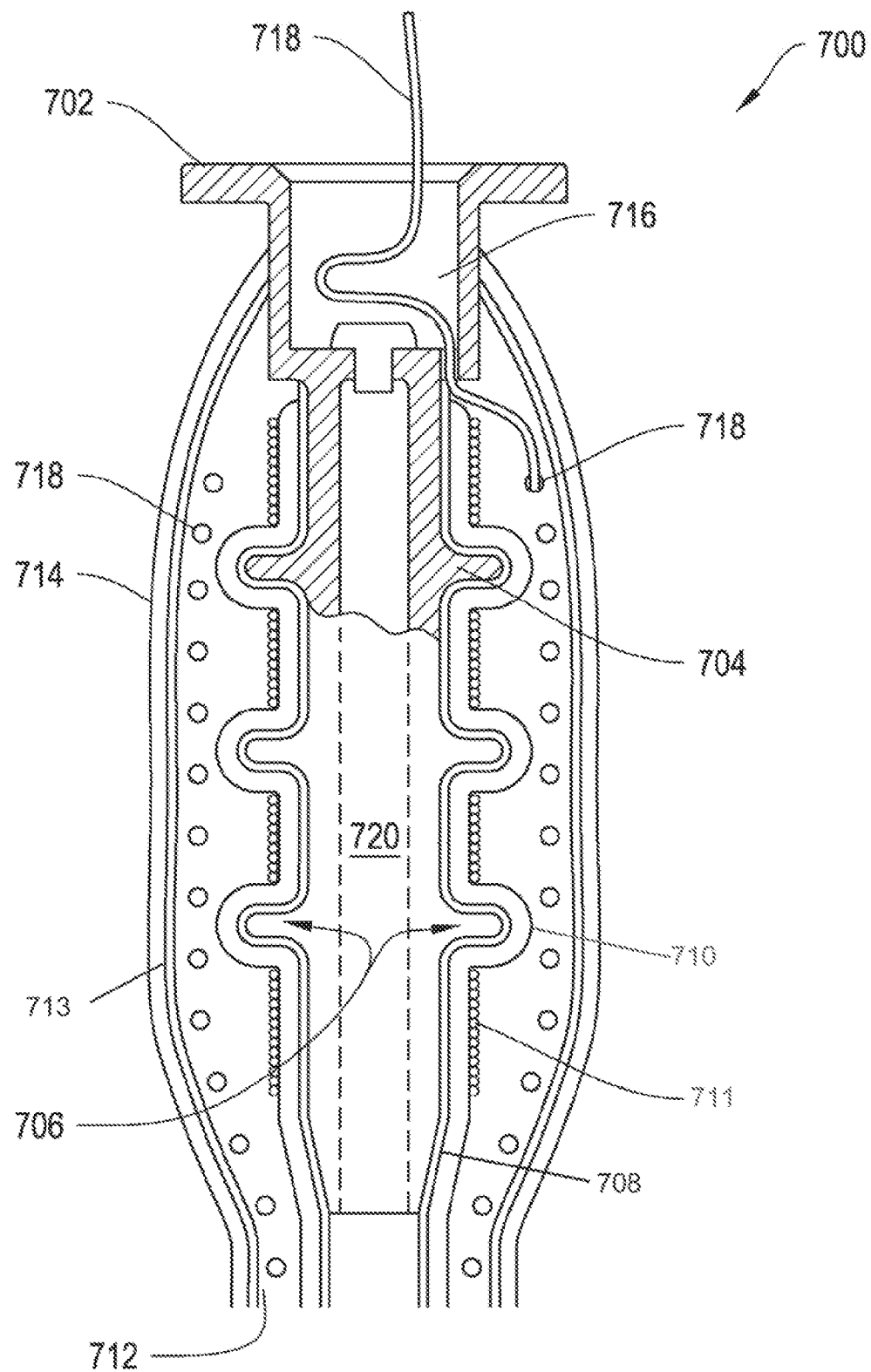
FIG. 7 depicts a cross-section of a hose coupling, according to an illustrative embodiment.

FIG. 7 depicts a cross-section of a hose coupling 700 according to an illustrative embodiment. Hose coupling 700 is similar to coupling 41, shown in FIG. 3, and may be a hollow cylindrical hose coupling with a cavity 720 in the center. Hose coupling 700 includes a first coupling section 702 and a second coupling insert 704, each of which are hollow. Second coupling insert 704 may interfit within an internal cavity of first coupling section 702, for example via a threaded connection. The second coupling insert 704 may allow the addition and/or removal of fill fluid into or out of the hose, and may be closed with a check valve or plug (not shown). In some embodiments, the second coupling insert 704 may be secured to the first coupling section 702 via alternative or additional methods. For example, in FIG. 7, the addition of potting compound 716 seals the interface of the second coupling insert 704 to the first coupling section 702. The potting compound 716 may also protect the conductors 718 after their emergence from the hose wall. A flange on the top side of the first coupling section 702 may be used for attaching the hose to different elements such as to the surface buoy or to the subsurface buoy shown in FIG. 2.

The first coupling section 702 may include a hose flange with one or more peripheral ridges 706. One or more of peripheral ridges 706 may be continuous around the entire outer surface of the first coupling section 702. The hose coupling 700 includes a hose body with an inner layer 708, similar to inner layer 102 (FIG. 4), reinforcement bands 710 similar to reinforcement band 104 (FIG. 4), a conductor layer 712 with embedded conductors 718, and an outer protective layer 714. This hose body may be built up and secured over the peripheral ridges 706 by, for example, pressing the inner layer or reinforcement ribbons into the valleys between the ridges by applying tight wraps of tensioned fine seizing wire 711 which prevents the ribs being pulled over the external ribbon's "crowns". This allows for the transfer of hose tension to the coupling. In this embodiment, the couplings become integral parts of a hose length, which transfer the longitudinal hose load into a fitting junction box or other hardware (not shown) at each hose end. In some embodiments, the hose body may further include separation rubber layers between reinforcement bands as well as embedded specially reinforced fish-bite prevention layers 713 similar to helically wrapped tire cord layer 46 positioned between parts 712 and 714.

Referring back to FIG. 3, in some embodiments, additional layers of reinforcing cord may be positioned near the coupling. In such embodiments, the layers may end staggered along a section of the hose body, starting from the coupling 41 to form a stretch and bend limiting zone. The extra reinforced layers in this zone may be designed to allow a gradual decrease in stretch from the high strain under load in the center hose length to near zero hose stretch at the coupling by adding more and more counter-helical reinforcement layers with decreasing wrap angles towards the hose coupling. Large destructive extension and retraction of the hose under changing load levels in contact with the coupling's tubing may be so avoided. In certain embodiments, there are additional intermediate layers of rubber which may be sandwiched between the counter-helical tire cord layers and conductor layers for abrasion protection. The counter-helical reinforcement layers may be designed to minimize any torque and rotation development of the finished hose under tension, to prevent rotation of the hose under applied mooring tensions.

The conductors 718 embedded in protecting rubber layers 712 may be helically wrapped around the reinforcement bands 710 in a stretch-neutral geometry. As the embedded conductors 718 approach the end of the first coupling section with the second coupling section, the embedded conductors 718 may pass through the first and/or the second coupling sections via, for example, a hole drilled into the wall of the first and/or the second coupling sections. As mentioned previously, the first and second coupling sections may be hollow, allowing the conductors 718 to pass through the central cavity 720 that extends through the two coupling sections. While the embedded conductors 718 are shown exiting from the potting compound 716, in other embodiments, the embedded conductors 718 may exit via the central cavity of the second coupling section 704. The conductors 718 may be able to pass from the hose to the coupling and out without being exposed to the external environment, thus minimizing corrosion and damage of the conductors. There may be one hole or several holes bored through the coupling body near the flange to allow the conductors 718 to be directly fed from their embedded position in the hose wall to the inner opening of the hose flange without coming into exposure to the sea-water surrounding the buoy. There may be also a special cavity provided in the hose body (not shown here) into which the conductors 718 are first fed before guided into the coupling cavity which later is filled with potting compound 716.

Figure 8:
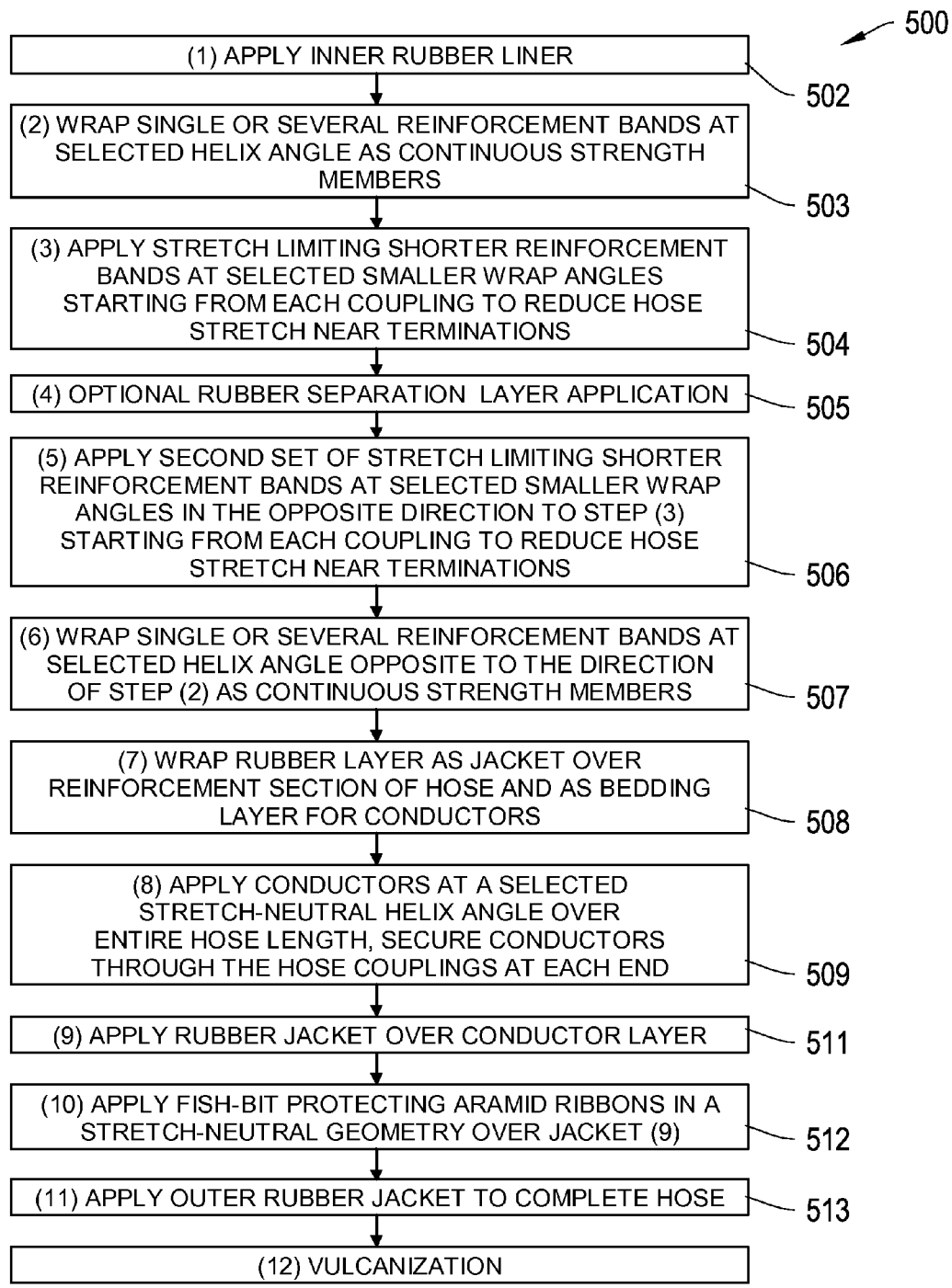
FIG. 8 is a flowchart of a method for manufacturing a stretchable hose system, according to an illustrative embodiment.

FIG. 8 is a flowchart depicting a stretchable hose manufacturing process 500 in accordance with an embodiment. In step 502, an inner layer, analogous to inner liner layer 102, is applied or formed into a tube. This may be done by wrapping ribbons of the inner layer material over a temporary long tubular rotating steel mandrel (a steel pole). For example, layers of un-vulcanized rubber sheets may be wrapped as overlapping ribbons over the mandrel to form the inner hose liner.

In Step 503, a single continuous layer of reinforcement band 104 is helically wrapped around the inner rubber tube optionally over the entire hose length, with the angle of wrapping determined at least partially by the desired final stretching characteristics of the hose system. This step is repeated later with the reinforcement wrap angle now in the opposite direction 505 with a second layer of continuous reinforcement band 104. In step 504 of FIG. 7 as an option a small number of stretch limiting shorter enforcement bands 104 are applied at each hose end which may be in the same wrap direction but at shallower wrap angles than the continuous band 104 in step 503. Thereby a section of gradually decreasing stretch of the hose near and at its coupling is produced.

In step 505 of FIG. 7 an optional rubber separation layer may be applied over the hose length In the following step 506 a second set of shorter stretch limiting reinforcement bands may be applied as in step 504, but in the wrap angles are applied in the opposite wrap directions In step 507 of FIG. 7 a single or several continuous reinforcement bands may be spiraled over the entire hose length. The band or bands is or are applied in the opposite wrap direction but with the same or similar wrap angle as in step 503.

In step 508 an outer jacket 712 is spiraled over the load carrying reinforcement layer(s) 710. This jacket may serve also as bedding layer for the conductors 718 if the hose is designed as electrical or optical link between surface buoy and sub-surface buoy.

As step 509 a single or several conductors 718 may be spiraled around the rubber bedding layer 712 in FIG. 7. The conductors are applied at a stretch neutral wrap angle which may be larger than the reinforcement wrap angles in steps 503 and 507, so that they are not elongated beyond a destructive 0.5% over the entire stretch range of the stretch range of the mooring hose.

In step 510 of FIG. 7 an additional rubber jacket 712 may be applied to cover and protect the spiraled conductors.

A fishbite protecting layer assembly 713 of reinforcing bands and rubber separation layers may be applied as optional step 511 in FIG. 7, preferably positioned over the entire length of additional rubber jacket 712 furnished in step 510. This assembly preferably consists of two counter-helical layers of reinforcement bands, where the reinforcing cords may be fabricated from cut-resistant para-aramid or liquid crystal polymer fibers to protect the conductors and the continuous reinforcement layers from fish-bite. The counter-helical layers are applied with high wrap angles to maintain near zero cord stretch and tension over the entire hose stretch range, and may be separated by a rubber layer.

The final production step 512 in FIG. 7 is an outer jacket 714 to complete the hose.

After completion of the manufacturing process the hose may be exposed to the vulcanization process 513, where the hose is preferably placed in an autoclave and exposed preferably for several hours to a pressurized steam environment. The vulcanization or curing process changes the rubber and completed hose wall and surface from fairly soft putty like crude material permanently to a highly elastic and tough material with a tire-like feel.

In certain embodiments, each ribbon or layer is helically wrapped around the hose such that it does not overlap with itself and/or form gaps between subsequent wraps. Such a wrap is known as a butt-wrap and may allowing maintaining the selected wrap angle with close tolerance. In some embodiments, this process is done by an operator or ribbon supplier moving along the rotating mandrel (e.g. by walking or on a moving platform or carriage) and supplying the reinforcement band 104. The movement rate (i.e. horizontal displacement per revolution of the mandrel) of the operator or ribbon supplier is adjustable so that the helical wrap angle of the served ribbons or reinforcement bands can be controlled. For a given diameter of the underlying hose body and a given ribbon width a selected wrap angle of the cords ribbons is maintained with close tolerance. The helical geometry of the reinforcing tire-cord ribbons together with the known load-elongation properties of the cord material and rubber material allows the determination of the hose load elongation behavior. In certain embodiments, the steeper the wrap angle of the tire cord ribbon layers, the more structural elongation is added to the overall stretch of the cords under applied loads. At wrap angles below an angle of ~54 degrees—called the neutral angle—both reinforcing cords and the stretching rubber wall may support the applied tension from the start. At wrap angles above the "neutral" angle the cord path initially shortens due to the diameter contraction of the stretching hose, the cords buckle until a wrap angle dependent extension is reached. Up to this extension the hose tension is entirely supported by the stretching rubber hose wall. Above the 'rubber only' stretch zone the reinforcing cord layers additionally support the two loads and eventually dominate the load sharing with the rubber wall.

A second reinforcement band is then wrapped around the inner rubber tube and first reinforcement band in step 506, in the opposite helical direction. The wrapping angle of the second reinforcement band may be the same as the first reinforcement band or may differ, but is governed by the desired final hose system stretching characteristics, and may be adjusted by changing the operator/ribbon supplier movement rate. Subsequent reinforcement bands, if any, are applied in step 508, with successive bands wrapping in alternate helical directions. These additional bands may provide higher strength for the hose. In certain embodiments, one or more separation layers may be applied over the first, second, or subsequent reinforcement bands. These separation layers may be made of rubber, and may separate consecutive reinforcement bands. In step 510, at least one cut-protection layer comprising a cut-resistance material such as a para-aramid synthetic fiber, liquid crystal polymer tire cords, and/or Kevlar® is helically wrapped around the hose with a wrap angle large enough to be stretch neutral. In steps 512 and 514, the hose is coated with an outer rubber layer, and the entire hose system is vulcanized to cross-link and cure the rubber present in the hose. The vulcanization process may occur by placing the hose system into an autoclave and exposed for several hours to a pressurized stem environment. The vulcanization or curing process changes the rubber and completed hose wall and surface from fairly soft putty like crude material to a highly elastic and tough material with a tire-like feel.

In some embodiments, additional, shorter reinforcement bands may be added at each hose end. This may be done after the first reinforcement band is wrapped, after the second reinforcement band is wrapped, or after subsequent reinforcement bands are added. In some embodiments, the additional, shorter reinforcement bands may be in the same wrap direction but at shallower wrap angles than the preceding reinforcement band. For example, additional, shorter reinforcement bands added after the first reinforcement band may be in the same wrap direction as the first reinforcement band but at a shallower wrap angle. This may provide a section of gradually decreasing stretch of the hose near and at its couplings.

In other embodiments, multiple consecutive reinforcement bands may be helically wrapped in the same direction. For example, two or more consecutive reinforcement bands may be wrapped around the inner rubber tube in the same helical direction in step 504. This may be followed by two or more consecutive reinforcement bands wrapped around in the opposite helical direction in step 506.

Optionally, other layers providing other functionality may be integrated into the manufacturing process. For example, one or more bands including electrical and/or optical conductors may be added to the wrapping process. In these embodiments, the conductors may be wrapped around the hose in between successive reinforcement bands, or may be wrapped around the hose just within the cut-protection layer. For example, the conductors may be wrapped around the hose after an intermediate layer has been applied over the reinforcement bands, but before the outer layer has been added in step 512. The intermediate layer may be made of rubber, and may provide a bedding layer for the conductors. The electrical and/or optical conductors may be helically wrapped with wrap angles large enough to be stretch neutral, such that even at full hose extension, the conductors are not damaged by exceeding their approximately 0.5 percent elastic elongation limits. In other embodiments, a cut-protection layer assembly of reinforcing bands and rubber separation layers may be applied. In some embodiments, the cut-protection layer may be applied on the exterior of the hose, or just before the application of the outer layer in step 512. This assembly may include two counter-helical layers of reinforcement bands, where the reinforcing cords may be fabricated from cut-resistant para-aramid or liquid crystal polymer fibers to protect the conductors and the reinforcement bands from cuts or fish-bites. The counter-helical layers may be applied with high wrap angles to maintain near zero cord stretch and tension over the entire hose stretch range, and may be separated by a rubber layer.

In some embodiments, hose couplings for one or both ends of the hose are mounted onto the mandrel. The hose couplings may be mounted before the first, inner layer is wrapped around the mandrel, or between any two successive bands or layers are wrapped around the mandrel. In other embodiments, the couplings may be added to the hose after it has been formed on the mandrel.

As explained above, the overall hose load elongation behavior is sensitive to the wrap angle, as shown in FIG. 6A. The hose may be water filled in service to prevent hose collapse under hydrostatic pressure. When tension is applied, the hose responds by stretching. The elongated water fill fluid inside the sealed hose reduces its inner hose diameter according to the constant volume law, also called isochoric condition.

The effectiveness of the systems and methods described herein is shown in FIG. 9, which compares sound attenuation data at different frequencies of whale sound listening buoy mooring configurations shown in FIGS. 1A and 1B with a stretch hose system found in FIG. 2. The first graph shows the attenuation versus frequency of the signal received from a mooring with the stretch hose isolator, and compares the results with the listening results of conventional buoy systems as shown in FIGS. 1A and 1B. More specifically, FIG. 9 provides a preliminary comparison of the spectral density functions for four different deployments of the auto detection buoy based on 255 2-second acoustic samples taken from approximately the same week in the same year (late March, early April).

The chart on the top depicts the data collected with the tether system depicted in FIG. 2. As can be seen, this system is significantly quieter in the lower frequency end, despite being in this test case, more exposed than the other three deployments that were in the lee off Wellfleet-Truro on the west side of the Cape Cod peninsula. The spikes around 300 Hz and 675 Hz are from specific tonal events, while the spike at the 43 Hz is similar to a residence bong. As can be seen by comparing the four charts, the system described herein provides a significant improvement over other versions and mooring systems. Thus the system helps improve detection of marine animal vocalizations by reducing the amount of background noise generated by the mooring system.

Figures 10A, 10B:
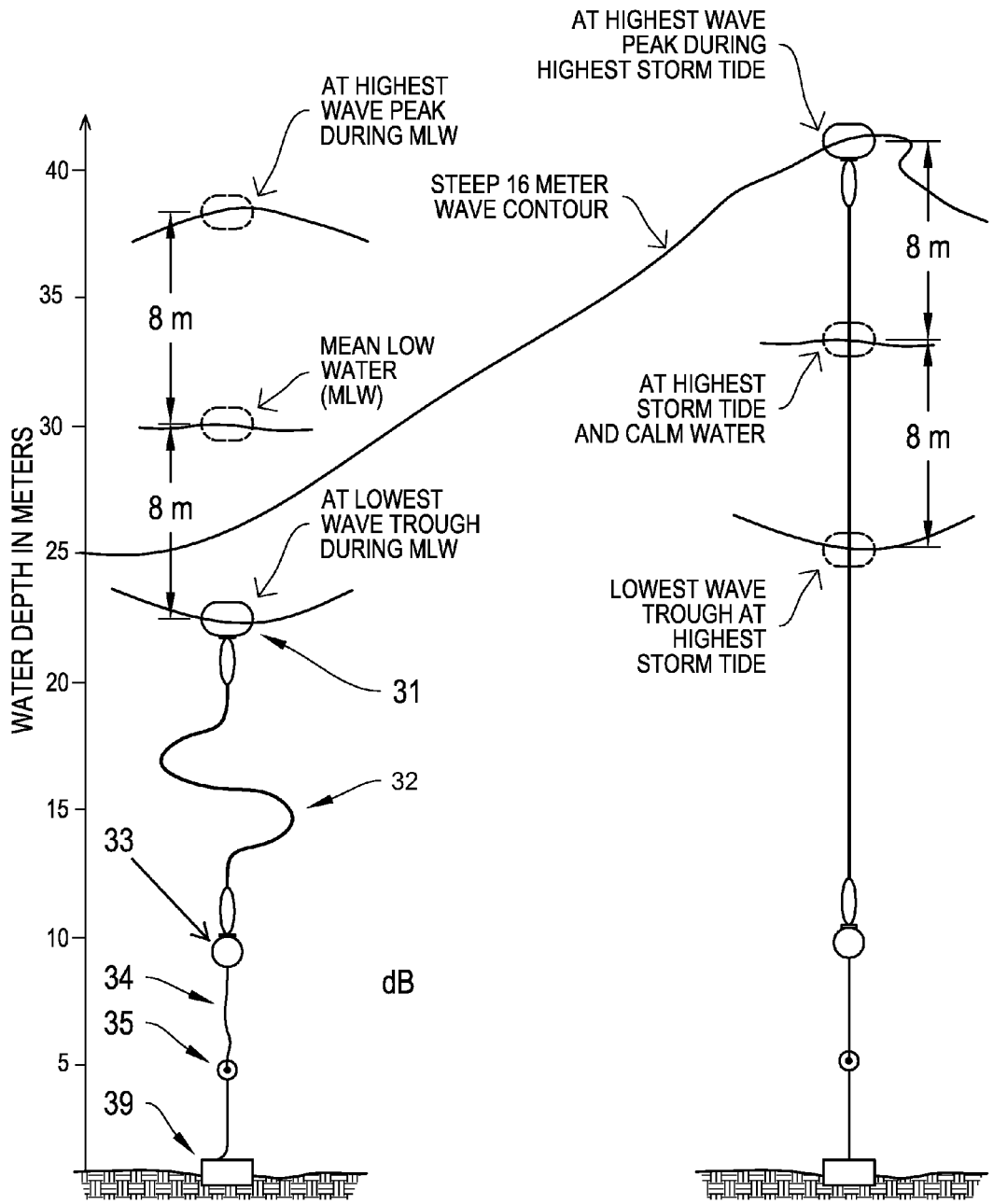
FIGS. 10A-B depict buoy moorings with stretchable hoses under varying wave conditions, according to illustrative embodiments.

FIGS. 10A-B depict buoy moorings with stretchable hoses, such as the buoy mooring described in relation to FIG. 2, under varying wave conditions, according to illustrative embodiments. FIG. 10A depicts a buoy mooring at different wave heights at a mean low water (MLW) level, and FIG. 10B depicts the buoy mooring at different wave heights at highest storm tide. In both cases, the length of the stretchable hose 32 is 15 meters.

In FIG. 10A, at the deepest wave trough, the surface buoy 31 drops 8 meter (26 ft) below the mean low water level. At this moment the stretchable hose 32 has to accommodate the largest slack of 3 meters (10 ft), since the normally 15-meter distance between subsurface buoy 33 and surface buoy 31 is reduced to 12 meters. The stretchable hose 32 accommodates this slack by forming a loop as shown in FIG. 10A. Such loop formations can be tolerated by the stretchable hose 32, because its chance of kinking is very low. In comparison, electro-mechanical (EM) cables, wire ropes, and some fiber rope constructions often form permanent kinks or hockles under similar conditions.

At the mean low water level in FIG. 10A (not shown in detail), the subsurface buoy 33 floats 30 meter above the sea-floor. The 15 meter long hose 32 is stretched 5 meters, and develops about 37 percent center section elongation, resulting in about 200 lbs tension in the hose link. The overall hose stretch is lower (33 percent), since the extra-reinforced hose sections next to the couplings stretch less (All values in this section are approximate).

At the highest wave peak during MLW (not shown in detail in FIG. 10A) the wave crest and surface buoy 31 are 8 meter above MLW or 38 meter above the sea floor. The 15 meter long hose 32 is forced to become 28 meter long, or increases its length 18 meter (59 ft), develops about 95% stretch in its compliant section and a tension of about 550 lbs.

At the highest wave crest at high storm tide (FIG. 10B) the surface buoy 31 is riding the wave peak 11 meter (36 ft) above MLW or 41 meter above the sea floor. At this highest position the surface buoy 31 extends the 15 meter long hose 32 to 31 meter (101 ft) length, a 16 meter length increase or 107 percent overall hose elongation. This elongates the compliant center section to 118%. Under this stretch the hose tension is about 660 lbs, loading the nylon tire cords to less than 8 percent of their breaking strength.

Even at the highest wave crest, discussed above, the hose 32 still has some stretch available, which allows lateral movement without overloading the hose 32. This horizontal movement might be forced by a passing wave crest and/or under ocean currents as a taut mooring.

A recent deployment of a buoy system with incorporated listening device, built according to the systems and methods described herein, demonstrated that whale communication was clearly transmitted to shore during all weather conditions, including during a violent North-Easter with ~11 meter (~36 ft) waves recorded by a weather buoy nearby.

In one implementation, an offshore liquefied natural gas import terminal currently under construction 14 miles southeast of Gloucester, Mass., is installing an acoustic monitoring system to protect whales in Massachusetts Bay, and similar systems are installed along a major shipping lane. The offshore port terminal initiative includes separate warning and research projects as the deepwater terminal lies in an area frequented by endangered Northern Right whales and other marine mammals, and is located near a marine sanctuary. In 2007 one of the shipping lanes to approach Boston Harbor was realigned to avoid an area where right whales congregate in larger numbers during certain times of the year. The shipping lanes were being furnished with a system of buoys deployed along the water way that listen for whales and broadcast their position to shore observation stations, which in turn will notify vessels operating in the area. Every fishing and commercial vessel in the area of the buoys will be able to receive this information and is advised to adjust course, speed, or both, and keep an extra lookout to help avoid collisions with whales. Collisions with large whales can also seriously damage or sink smaller vessels. The effects of underwater noise on the behavior of marine mammals are subject of significant research and need to be better understood. The buoy systems with the devices and methods described herein allow shore observers, scientists and engineers to detect and identify the different noise sources underwater.

To provide an overall understanding of the systems and methods described herein, certain illustrative embodiments have been described, including a mooring system that includes a stretchable undersea tether assembly that carries multiple electric conductors. However, it will be understood by one of ordinary skill in the art that the systems and methods described herein can be adapted and modified for other suitable applications and that such other additions and modifications will not depart from the scope hereof. Thus, those skilled in the art will know or be able to ascertain using no more than routine experimentation, many equivalents to the embodiments and practices described herein. Accordingly, it will be understood that the systems and methods described herein are not to be limited to the embodiments disclosed herein, but is to be understood from the following claims, which are to be interpreted as broadly as allowed under the law.

The invention claimed is:

1. A sensor system for use in an underwater environment, the system comprising:
   a surface buoy configured to be disposed at a surface location on a water body,
   an underwater sensor connected to the surface buoy,
   a stretchable hose having a characteristic stretch extension selected to accommodate a predicted vertical heave of the surface buoy, the stretchable hose being attached to the surface buoy, for connecting the sensor to the surface buoy, the stretchable hose comprising:
      at least one conductor disposed in a sidewall of the hose, and
      a hose coupling attached to one end of the stretchable hose, wherein the hose coupling is configured to allow the at least one conductor to pass from the sidewall of the stretchable hose through the hose coupling to an external interface without exposure to water, and
   an anchoring member connected to the sensor,
   wherein, in response to vertical heave of the surface buoy at the surface location on the water body, a length of the stretchable hose adjusts to thereby maintain the sensor at a predetermined depth in the water body.

2. The system of claim 1, wherein the stretchable hose includes a high stretch cord rubber hose having one or more synthetic fiber cord reinforcement bands.

3. The system of claim 1, wherein the stretchable hose is attached to a subsurface buoy, the subsurface buoy is attached to a conductor urethane chain, and the conductor urethane chain is attached to the sensor.

4. The system of claim 1, further comprising release device connected between the sensor and the anchoring member for allowing the sensor to separate from the anchoring member.

5. The system of claim 1, wherein the sensor is electrically connected to the surface buoy.

6. The system of claim 5, wherein the at least one conductor disposed within the sidewall of the hose is coupled to the sensor and the surface buoy.

7. The system of claim 6, wherein the at least one conductor is disposed within the stretchable hose in a stretch-neutral configuration.

8. The system of claim 1, further comprising a cage for housing the sensor.

9. The system of claim 8, wherein the cage houses a storage unit for storing data obtained by the sensor.

10. The system of claim 1, wherein the stretchable hose is formed from a material capable of stretching from about 40 percent to 200 percent of its maximum working load.

11. The system of claim 1, wherein the stretchable hose is formed from a material capable of stretching from about 40 percent to about 200 percent of its original length.

12. The system of claim 1, wherein the stretchable hose includes high stretching center section and a reinforced end section to allow for a gradual decrease in stretch from high strain under load in the center section.

13. The system of claim 1, wherein the stretchable hose includes a plurality of reinforcement bands organized into one or more layers.

14. The system of claim 1, wherein the stretchable hose includes a plurality of layers of rubber and one or more layers of reinforcement bands.

15. The system of claim 1, wherein the stretchable hose is pre-stretched to prevent at least a portion of the anchoring member from contacting a water body bottom surface.

16. The system of claim 1, wherein the stretchable hose further comprises a second hose coupling attached to another end of the stretchable hose.

17. The system of claim 1, wherein the stretchable hose further comprises a plurality of conductors disposed within the sidewall of the hose.

18. A method of manufacturing a sensor system for use in an underwater environment, comprising:
    providing a stretchable hose, comprising:
        a first end comprising a coupling and a second end;
        a sidewall comprising;
            an inner layer;
            at least one reinforcement ribbon having a plurality of cords embedded in a matrix, wrapped helically about the inner layer; and
            at least one conductor, wrapped helically about at least one of the inner layer and the at least one reinforcement ribbon, wherein the conductor connects the first end and the second end, and passing from the sidewall through the coupling to an external interface without exposure to water;
    attaching the first end of the stretchable hose to a surface buoy configured to be disposed at a surface location on a water body; and
    attaching the second end of the stretchable hose to a sensor.

* * * * *

UNITED STATES PATENT AND TRADEMARK OFFICE
CERTIFICATE OF CORRECTION

PATENT NO. : 8,279,714 B2  Page 1 of 1
APPLICATION NO. : 12/632632
DATED : October 2, 2012
INVENTOR(S) : Walter Paul et al.

It is certified that error appears in the above-identified patent and that said Letters Patent is hereby corrected as shown below:

In the Claims:

In claim 4, column 20, line 40, insert --a-- before the words "release device"

Signed and Sealed this
Twentieth Day of November, 2012

David J. Kappos
*Director of the United States Patent and Trademark Office*